(12) United States Patent
Huang

(10) Patent No.: US 10,469,135 B2
(45) Date of Patent: Nov. 5, 2019

(54) TRANSMISSION CONTROL METHODS AND TRANSMISSION CONTROL APPARATUS

(71) Applicant: BEIJING ZHIGU RUI TUO TECH Co., LTD., Beijing (CN)

(72) Inventor: Weicai Huang, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 107 days.

(21) Appl. No.: 15/540,766

(22) PCT Filed: Nov. 20, 2015

(86) PCT No.: PCT/CN2015/095175
§ 371 (c)(1),
(2) Date: Jun. 29, 2017

(87) PCT Pub. No.: WO2016/107330
PCT Pub. Date: Jul. 7, 2016

(65) Prior Publication Data
US 2017/0359105 A1 Dec. 14, 2017

(30) Foreign Application Priority Data
Dec. 31, 2014 (CN) .......................... 2014 1 0852698

(51) Int. Cl.
*H04W 4/00* (2018.01)
*H04B 7/04* (2017.01)
(Continued)

(52) U.S. Cl.
CPC ............. *H04B 7/04* (2013.01); *H04B 7/0413* (2013.01); *H04B 7/0686* (2013.01);
(Continued)

(58) Field of Classification Search
CPC ...... H04B 7/04; H04B 7/0413; H04B 7/0686; H04L 1/0026; H04L 1/06
See application file for complete search history.

(56) References Cited

U.S. PATENT DOCUMENTS

| 7,756,099 B2 | 7/2010 | Tao et al. |
| 2004/0082356 A1 | 4/2004 | Walton et al. |

(Continued)

FOREIGN PATENT DOCUMENTS

| CN | 1960199 A | 5/2007 |
| CN | 101166054 A | 4/2008 |

(Continued)

OTHER PUBLICATIONS

International Search Report and Written Opinion for Application No. PCT/CN2015/095175, dated Feb. 29, 2016, 8 pages.

*Primary Examiner* — Minh Trang T Nguyen
(74) *Attorney, Agent, or Firm* — Sheppard Mullin Richter & Hampton LLP

(57) ABSTRACT

Embodiments of the present application provide transmission control methods and transmission control apparatus. A method disclosed herein comprises: determining transmission capability of a first device; and determining transmission configuration between the first device and a second device at least according to the transmission capability of the first device, the transmission configuration comprising information associated with at least two multiple-input-multiple-output (MIMO) channels available for data transmission between the first device and the second device. The method and apparatus of the embodiments of the present application support that at least two separate MIMO channels coexist between an access terminal (AT) device and an access point (AP) device as well as between two AT devices, which have flexible configuration while ensuring a higher data transmis- (Continued)

sion rate, and computational complexity is not high for the devices, which can reduce power consumption of the devices.

34 Claims, 21 Drawing Sheets

(51) Int. Cl.
    *H04L 1/06*     (2006.01)
    *H04L 1/00*     (2006.01)
    *H04B 7/0413*     (2017.01)
    *H04B 7/06*     (2006.01)

(52) U.S. Cl.
    CPC .............. *H04L 1/0026* (2013.01); *H04L 1/06* (2013.01); *Y02D 70/1262* (2018.01); *Y02D 70/164* (2018.01); *Y02D 70/444* (2018.01)

(56) References Cited

U.S. PATENT DOCUMENTS

| | | | |
|---|---|---|---|
| 2005/0085197 A1 | 4/2005 | Laroia et al. | |
| 2011/0164695 A1* | 7/2011 | Zheng | H04B 7/086 375/260 |
| 2011/0176519 A1 | 7/2011 | Vitthaladevuni et al. | |
| 2014/0079147 A1* | 3/2014 | Nammi | H04B 7/0619 375/267 |
| 2014/0177526 A1 | 6/2014 | Lidian et al. | |
| 2014/0254699 A1 | 9/2014 | Kusunoki | |
| 2014/0348017 A1 | 11/2014 | Zhu | |
| 2015/0085954 A1* | 3/2015 | Han | H04B 7/0413 375/295 |
| 2015/0171943 A1 | 6/2015 | Jongren et al. | |
| 2015/0249562 A1 | 9/2015 | Zhang et al. | |
| 2016/0119049 A1 | 4/2016 | Cui et al. | |

FOREIGN PATENT DOCUMENTS

| | | |
|---|---|---|
| CN | 101166072 A | 4/2008 |
| CN | 101743699 B | 4/2008 |
| CN | 101345566 A | 1/2009 |
| CN | 102474407 A | 5/2012 |
| CN | 102572915 A | 7/2012 |
| CN | 102598529 A | 7/2012 |
| CN | 102742175 A | 10/2012 |
| CN | 104052583 A | 9/2014 |
| CN | 104067532 A | 9/2014 |
| CN | 104601281 A | 5/2015 |
| WO | 2011/098015 A1 | 8/2011 |

\* cited by examiner

TRANSMISSION CONTROL METHODS AND TRANSMISSION CONTROL APPARATUS

CROSS-REFERENCE TO RELATED APPLICATIONS

This application is a National Phase Application of International Application No. PCT/CN2015/095175, filed on Nov. 20, 2015, which claims priority to and benefit of Chinese Patent Application No. 201410852698.X, filed with the Chinese Patent Office on Dec. 31, 2014 and entitled "TRANSMISSION CONTROL METHODS AND TRANSMISSION CONTROL APPARATUS". Both of the above-referenced applications are incorporated in the present application by reference in their entirety.

TECHNICAL FIELD

Embodiments of the present application generally relate to the field of mobile communications technologies, and in particular, to transmission control methods and transmission control apparatus.

BACKGROUND

With rapid increase of social information communication demands and fast popularization of mobile communication technologies, frequency spectrums have become more and more valuable resources. In order to expand the communication capacity and maximize utilization of limited frequency spectrum resources, more antennas are deployed on mobile terminals and base stations, and increase of the number of antennas will have higher requirements for transmission configuration flexibility and computing capabilities of the devices during data transmission.

SUMMARY

In view of this, one objective of the embodiments of the present application is to provide a transmission control solution.

To achieve the objective, in a first aspect, the embodiments of the present application provide a transmission control method, the method comprising:

determining transmission capability of a first device; and determining transmission configuration between the first device and a second device at least according to the transmission capability of the first device, the transmission configuration comprising information associated with at least two multiple-input-multiple-output (MIMO) channels available for data transmission between the first device and the second device.

In a second aspect, the embodiments of the present application provide a transmission control method, the method comprising:

determining transmission capability of a first device; and determining a transmission mode of data transmission performed by the first device and a second device at least according to the transmission capability of the first device, the transmission mode comprising information associated with using at least two MIMO channels for the data transmission performed by the first device and the second device.

In a third aspect, the embodiments of the present application provide a transmission control method, the method comprising:

sending transmission capability of a first device; and receiving transmission configuration between the first device and a second device, the transmission configuration being at least related to the transmission capability of the first device, and comprising information associated with at least two MIMO channels available for data transmission between the first device and the second device.

In a fourth aspect, the embodiments of the present application provide a transmission control method, the method comprising:

sending transmission capability of a first device; and receiving a transmission mode of data transmission performed by the first device and a second device, the transmission mode being at least related to the transmission capability of the first device, and the transmission mode comprising information associated with using at least two MIMO channels for the data transmission performed by the first device and the second device.

In a fifth aspect, the embodiments of the present application provide a transmission control apparatus, the apparatus comprising:

a first determination module, configured to determine transmission capability of a first device; and a second determination module, configured to determine transmission configuration between the first device and a second device at least according to the transmission capability of the first device, the transmission configuration comprising information associated with at least two MIMO channels available for data transmission between the first device and the second device.

In a sixth aspect, the embodiments of the present application provide a transmission control apparatus, the apparatus comprising:

a sixth determination module, configured to determine transmission capability of a first device; and a seventh determination module, configured to determine a transmission mode of data transmission performed by the first device and a second device at least according to the transmission capability of the first device, the transmission mode comprising information associated with using at least two MIMO channels for the data transmission performed by the first device and the second device.

In a seventh aspect, the embodiments of the present application provide a transmission control apparatus, the apparatus comprising:

a fifth sending module, configured to send transmission capability of a first device; and a first receiving module, configured to receive transmission configuration between the first device and a second device, the transmission configuration being at least related to the transmission capability of the first device, and comprising information associated with at least two MIMO channels available for data transmission between the first device and the second device.

In an eighth aspect, the embodiments of the present application provide a transmission control apparatus, the apparatus comprising:

a ninth sending module, configured to send transmission capability of a first device; and a third receiving module, configured to receive a transmission mode of data transmission performed by the first device and a second device, the transmission mode being at least related to the transmission capability of the first device, and the transmission mode comprising information associated with using at least two MIMO channels for the data transmission performed by the first device and the second device.

In a ninth aspect, the embodiments of the present application provide a computer readable storage device, comprising at least one set of executable instructions, which, in response to execution, cause a system comprising a processor to perform operations, comprising:

determining transmission capability of a first device; and determining transmission configuration between the first device and a second device at least according to the transmission capability of the first device, the transmission configuration comprising information associated with at least two multiple-input-multiple-output (MIMO) channels available for data transmission between the first device and the second device.

In a tenth aspect, the embodiments of the present application provide a device for transmission control comprising a processor and memory, wherein the memory storing computer executable instructions, the processor being connected with the memory via a communication bus, and when the device is operating, the processor executes or facilitates execution of the executable instructions stored by the memory:

determining transmission capability of a first device; and determining transmission configuration between the first device and a second device at least according to the transmission capability of the first device, the transmission configuration comprising information associated with at least two multiple-input-multiple-output (MIMO) channels available for data transmission between the first device and the second device.

In an eleventh aspect, the embodiments of the present application provide a computer readable storage device, comprising at least one set of executable instructions, which, in response to execution, cause a system comprising a processor to perform operations, comprising:

determining transmission capability of a first device; and determining a transmission mode of data transmission performed by the first device and a second device at least according to the transmission capability of the first device, the transmission mode comprising information associated with using at least two multiple-input-multiple-output (MIMO) channels in the data transmission performed by the first device and the second device.

In a twelfth aspect, the embodiments of the present application provide a device for transmission control comprising a processor and memory, wherein the memory storing computer executable instructions, the processor being connected with the memory via a communication bus, and when the device is operating, the processor executes or facilitates execution of the executable instructions stored by the memory:

determining transmission capability of a first device; and determining a transmission mode of data transmission performed by the first device and a second device at least according to the transmission capability of the first device, the transmission mode comprising information associated with using at least two multiple-input-multiple-output (MIMO) channels in the data transmission performed by the first device and the second device.

In a thirteenth aspect, the embodiments of the present application provide a computer readable storage device, comprising at least one set of executable instructions, which, in response to execution, cause a system comprising a processor to perform operations, comprising:

sending transmission capability of a first device; and receiving transmission configuration between the first device and a second device, the transmission configuration being at least related to the transmission capability of the first device, and comprising information associated with at least two multiple-input-multiple-output (MIMO) channels available for data transmission between the first device and the second device.

In a fourteenth aspect, the embodiments of the present application provide a device for transmission control comprising a processor and memory, wherein the memory storing computer executable instructions, the processor being connected with the memory via a communication bus, and when the device is operating, the processor executes or facilitates execution of the executable instructions stored by the memory:

sending transmission capability of a first device; and receiving transmission configuration between the first device and a second device, the transmission configuration being at least related to the transmission capability of the first device, and comprising information associated with at least two multiple-input-multiple-output (MIMO) channels available for data transmission between the first device and the second device.

In a fifteenth aspect, the embodiments of the present application provide a computer readable storage device, comprising at least one set of executable instructions, which, in response to execution, cause a system comprising a processor to perform operations, comprising:

sending transmission capability of a first device; and receiving a transmission mode of data transmission performed by the first device and a second device, the transmission mode being at least related to the transmission capability of the first device, and the transmission mode comprising information associated with using at least two multiple-input-multiple-output (MIMO) channels for the data transmission performed by the first device and the second device.

In a sixteenth aspect, the embodiments of the present application provide a device for transmission control comprising a processor and memory, wherein the memory storing computer executable instructions, the processor being connected with the memory via a communication bus, and when the device is operating, the processor executes or facilitates execution of the executable instructions stored by the memory:

sending transmission capability of a first device; and receiving a transmission mode of data transmission performed by the first device and a second device, the transmission mode being at least related to the transmission capability of the first device, and the transmission mode comprising information associated with using at least two multiple-input-multiple-output (MIMO) channels for the data transmission performed by the first device and the second device.

The methods and apparatuses of the embodiments of the present application support that at least two separate MIMO channels coexist between an access terminal (AT) device and an access point (AP) device as well as between two AT devices, which have flexible configuration while ensuring a high data transmission rate, and computational complexity is not high for the devices, thus saving power consumption of the devices.

BRIEF DESCRIPTION OF THE DRAWINGS

FIG. 8(a) to FIG. 8(l) are exemplary structural block diagrams of a transmission control apparatus according to a second embodiment of the present application;

FIG. 9(a) to FIG. 9(l) are exemplary structural block diagrams of a transmission control apparatus according to a second embodiment of the present application;

DETAILED DESCRIPTION

Figure 1:
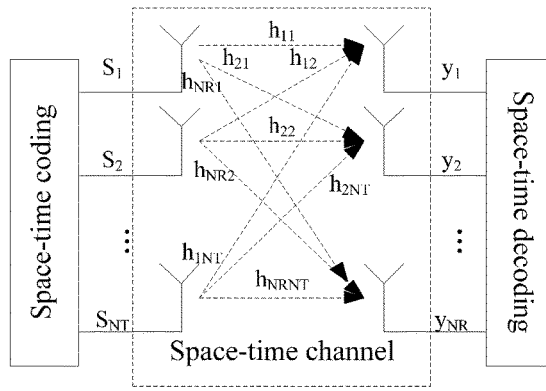
FIG. 1 is a schematic diagram of an exemplary MIMO system.

Specific implementations of the present application are further described below in detail with reference to the accompanying drawings and embodiments. The following embodiments are intended to describe the present application, but are not intended to limit the scope of the present application.

It should be understood by those skilled in the art that the terms such as "first" and "second" in the present application are merely intended to distinguish different devices, modules or parameters, etc., which neither represent any particular technical meaning nor indicate a necessary logical sequence between them.

The technical solutions described in various embodiments of the present application can be applied to various wireless MIMO communications networks, for example, Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks and so on. The terms "system" and "network" can generally be used interchangeably. For the sake of clarity, the following description of various embodiments of the present application takes an LTE system as an example to describe some aspects of the technical solutions of the present application, and terms of LTE-A technologies are used in parts of the following description.

In addition, in various embodiments of the present application, according to different bodies that adopt the technical solutions of various embodiments of the present application, the first device and the second device may be, respectively: an AT device and an AP device, an AT device and an AT device. The AP may comprise, be implemented as, or be called a node B, an evolved node B (eNode B), a radio network controller (RNC), a base station controller (BSC), a base transceiver station (BTS), a base station (BS), a transceiver function (TF), a wireless router, a wireless transceiver, a Basic Service Set (BSS), an extended service set (ESS), a radio base station (RBS), and certain other terms. The AT may comprise, be implemented as, or be called AT, subscriber station, subscriber unit, mobile station, remote station, remote terminal, user terminal, user agency, user apparatus, user device, subscriber station, or certain other terms. In some implementations, the AT may comprise a cellular phone, a Session Initiation Protocol (SIP) phone, a wireless local loop (WLL) station, a personal digital assistant (PDA), a handheld device with wireless connection capability, a station (STA), or certain other possible devices connected to a wireless modem. Specifically, in the embodiments of the present application, the first device may comprise: a phone (for example, a cellular phone or a smartphone), a computer (for example, a notebook computer), a portable communication device, a portable computing device (for example, personal data assistant), an entertainment device (for example, a music or video device, or a satellite radio device), a Global Positioning System (GPS) Device, or be configured as any other suitable device configured for communicating via wireless or wired mediums.

Generally, a wireless multiple-access communication system can simultaneously support communication of multiple AT devices. Each AT device communicates with one or more base stations via transmission on forward and reverse links. The forward link (or downlink) refers to a communication link from a base station to a terminal, and the reverse link (or uplink) refers to a communication link from a terminal to a base station. Such a communication link can be established through a MIMO system. Referring to FIG. 1, FIG. 1 illustrates an exemplary MIMO system, a transmitting end and a receiving end of the system adopt multiple antennas (or array antennas) for data transmission, and data streams form $N_T$ sub-streams $(S_1, S_2, \ldots, S_{NT})$ by space-time coding, are transmitted out through $N_T$ transmitting antennas, and, after passing through space-time MIMO channels, are received by $N_R$ receiving antennas to obtain $N_R$ data sub-streams $(y_1, y_2, \ldots, y_{NT})$. A receiver can separate and decode the sub-streams by using advanced space-time coding, so as to achieve optimal processing. Use of the MIMO technology can improve channel capacity, and also increase channel reliability and reduce bit error rates.

With increase of the number of base stations and/or antennas of the terminal device, a data wireless transmission rate is also improved, but new requirements are put forward for configuration of wireless channels and computational capability of a transceiver for coding and decoding; the embodiment of the present application provides a new transmission control solution, especially applicable to a terminal device having multiple antennas.

Figure 2:
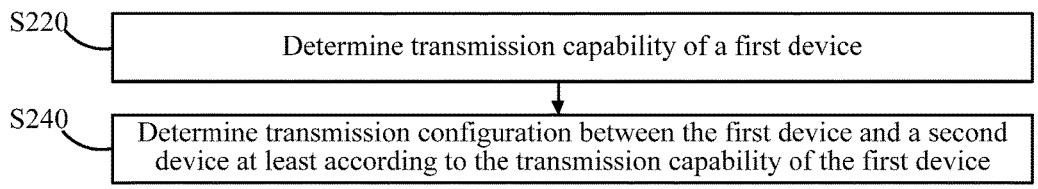
FIG. 2 is an exemplary flowchart of a transmission control method according to a first embodiment of the present application.

Referring to FIG. 2, FIG. 2 is a flowchart of an exemplary transmission control method according to a first embodiment of the present application. The method may be executed by a first device, by a second device, or by a third-party device independent of the first device and the second device. As shown in FIG. 2, the method comprises:

S220. Determine Transmission Capability of a First Device.

In the method of this embodiment, the transmission capability of the first device may comprise antenna configuration of the first device and transmission modes that can be supported by the first device. The antenna configuration of the first device may comprise the number of antennas that the first device has or can use, and how many receiving antennas, how many transmitting antennas there may be and so on. The transmission modes refer to data transmission manners, for example, spatial diversity, Beamforming and the like. Transmission modes specified for different networks may be different, and by taking LTE-A as an example, nine transmission modes are specified.

S240. Determine transmission configuration between the first device and a second device at least according to the transmission capability of the first device, the transmission configuration comprising information associated with at least two MIMO channels available for data transmission between the first device and the second device.

According to the role played by the body performing the method of this embodiment, the determination may be used to establish the at least two MIMO channels between the first device and the second device, and can also be used to establish a new MIMO channel and/or modify a MIMO channel currently used in a process of data transmission between the first device and the second device. In addition, the MIMO channel refers to, for example, a general term of $N_T \times N_R$ channels formed between $N_T$ transmitting antennas and $N_R$ receiving antennas, wherein at least one of $N_T$ and $N_R$ is greater than 1. A channel between each pair of transmitting antenna and receiving antenna is called a sub-channel of the MIMO channel.

To sum up, a method of this embodiment supports that at least two separate MIMO channels coexist during data transmission between the first device and the second device.

In one possible implementation, it is possible that at least part of antennas, which belong to the first device, in the antennas forming the at least two MIMO channels are the same, that is, part or all of antennas of the first device comprised in the at least two MIMO channels may be the same. In such an implementation, such at least two MIMO channels may occupy different time resources, for example, in a TDD LTE system employing the method of this embodiment, a terminal has four antennas, two MIMO channels exist between an eNode B and a terminal device, the two MIMO channels each including all four antennas of the terminal, one MIMO channel is configured to receive downlink signals, and the other one is configured to send uplink signals; in order to achieve better transmission efficiency, the two MIMO channels can be defined to use different transmission modes, for example, one performs transmission in a manner of spatial diversity, and the other performs transmission in a manner of Beamforming; or the two MIMO channels can send different data streams at different times. The at least two MIMO channels coexisting may be determined before data transmission is performed by the first device and the second device, so as to save the time on waiting during the process of data transmission and performing MIMO channel reconfiguration according to Channel Quality Indicators (CQIs) reported by the first device, and, although the same antenna may be included in different MIMO channels, for a corresponding upper layer, each MIMO channel is an independent channel, which can be flexibly configured by the upper layer, such as allocating an encoding matrix thereto.

In another possible implementation, all the antennas of the first device included in the at least two MIMO channels may be different, that is, each of the at least two MIMO channels only includes part of the antennas of the first device, which greatly reduces computational complexity of the AT and reduces device power consumption. This is because: for the MIMO system as shown in FIG. 1, for example, in a closed-loop spatial multiplexing transmission mode, a user terminal needs to feed back an Rank Indicator (RI), a precoding matrix indicator (PMI), and a CQI to a base station. The base station, according to the feedback of the user terminal and some other reference factors, such as data to be transmitted, allocates a corresponding transmission mode to the user terminal. For a $N_T \times N_R$ MIMO channel, the terminal needs to estimate a $N_R \times N_R$ channel matrix while calculating the RI, and after the matrix is transformed, a rank of the matrix is the value of the RI. The computational complexity of the whole process is the square of $N_R$. Similarly, multiple codebooks with a maximum index of $N_R \times N_R$ may usually be designed in a LTE standard, and the RI selects an optimal codeword therefrom according to channel conditions and the like, and then reports the corresponding index to the base station. The computational complexity of this process is also the square of $N_R$. In such an implementation of this embodiment, each MIMO channel only includes part of the antennas, and the computational complexity is relatively lower.

It should be noted that, the antennas comprised in each MIMO channel can be determined according to various suitable technologies, for devices on either side (the first device and the second device), for example, the antennas comprised in each MIMO channel may be determined on the premise of reducing correlation between the antennas as much as possible, and antennas having a certain spatial distance may be selected.

To sum up, the method of this embodiment supports that at least two separate MIMO channels coexist between an AT device and an AP device as well as between two AT devices, which has flexible configuration while ensuring a higher data transmission rate, and computational complexity is not high for the devices, which can reduce power consumption of the devices.

In addition, the transmission configuration determined in step S240 may be determined before the first device and the second device perform data transmission, and may also be determined during the data transmission between the first device and the second device, comprising: determining at least one MIMO channel before the first device and the second device perform data transmission, and establishing the at least one MIMO channel between the first device and the second device; during the data transmission, determining at least one other MIMO channel or re-determining at least two MIMO channels, and establishing the at least one other MIMO channel or re-determining the at least two MIMO channels, to cause that at least two MIMO channel coexist during the data transmission between the first device and the second device. According to different factors such as time and effect of the determination, in one possible implementation, step S240 comprises:

S242. Determine the transmission configuration at least according to the transmission capability of the first device and data transmission demands between the first device and the second device.

The data transmission demands may comprise at least one of the following: service of quality (QoS) requirements of data transmission, transmission rate requirements, user preference and so on. Such an implementation may be applicable before the data transmission or during the data transmission. For example, the data transmission demands change during the data transmission, and in response to this, the system can determine the remaining at least one MIMO channel and/or reconfigures a current MIMO channel adaptively.

In another possible implementation, step S240 may comprise:

S244. Determine the transmission configuration at least according to the transmission capability of the first device and channel state information between the first device and the second device.

That is, before the data transmission, in addition to the transmission capability of the first device, a channel state between the first device and the second device can be considered comprehensively, to determine suitable MIMO channels of which at least channel condition is suitable for transmitting data to be transmitted; during the data transmission, if a channel condition changes, it is possible that the current MIMO channel can no longer meet current data transmission demands, the transmission configuration may be determined in response to this, thus selecting suitable MIMO channels.

In such an implementation, the method of this embodiment further comprises:

S230: Determine the channel state information between the first device and the second device.

According to different transmission scenarios, there are different ways to determine the channel state information, by taking a LTE system as an example, when uplink scheduling is performed by the eNode B, the user terminal needs to transmit a sounding reference signal (SRS), to allow the eNode B to perform channel estimation, and in such an implementation, step S230 may comprise:

S232: Determine the channel state information at least according to a SRS sent from the first device to the second device.

When the eNode B performs downlink scheduling, the user terminal may feedback CQIs, Rank Indicators (PMIs are further comprised in the case of closed-loop spatial diversity) and other information, to support the eNode B to perform adaptive code modulation, precoding, channel estimation and so on, and in such an implementation, step S230 may comprise:

S234. Determine the channel state information between the first device and the second device at least according to CQIs and/or Rank Indicators of at least part of all possible wireless channels between the first device and the second device sent from the first device to the second device. The all possible wireless channels refer to channels that can be formed between each transmitting antenna and each receiving antenna, comprising allocated wireless channels configured to perform data transmission between the first device and the second device, wireless channels allocated to other devices and idle wireless channels. Channel state information of all wireless channels can be determined according to CQIs and/or Rank Indicators and other information of at least part of all the wireless channels, and suitable MIMO channels may be determined. In one possible implementation, the at least part of all possible wireless channels comprise wireless channels not used for data transmission currently.

In the implementation where one or more MIMO channels between the first device and the second device have been determined, step S230 may further comprise:

S236. Determine the channel state information associated with at least one MIMO channel at least according to CQIs and/or Rank Indicators associated with the at least one MIMO channel sent from the first device to the second device. The at least one MIMO channel is a MIMO channel that has been used for data transmission between the first device and the second device, and according to channel state information of the MIMO channel that has been used, it can be determined whether the MIMO channel is still qualified for transmission demands of data currently transmitted and whether it is necessary to establish at least one other MIMO channels, comprising adding MIMO channels and reconfiguring existing MIMO channels.

In the implementation where the first device is an AT device and the second device is an AP device, antenna allocation of the AT device is a mature prior art and is not a limitation to the technical solution of this embodiment; in the methods of this embodiment, in order to support multiple MIMO channels between the first device and the second device, multiple antennas of the first device have capability of grouping or have been divided into multiple antenna groups, each of which comprises at least one antenna. Therefore, step S240 is mainly configured to determine antenna groups of the first device comprised in each of the at least two MIMO channels available for data transmission between the first device and the second device, at least according to the transmission capability of the first device. That is, the antenna configuration of the first device determined in step S240 further comprises the number of antennas that the first device has and the first device's capability of dividing the antennas into at least two antenna groups, and the body performing the method of this embodiment determines which antennas each of the at least two MIMO channels comprises in step S240. Alternatively, the antenna configuration of the first device determined in step S220 may directly comprise a grouping situation where the antennas are divided into at least two antenna groups, that is, the grouping situation of the first device is known, and the body performing the method of this embodiment determines which antenna groups each of the MIMO channels determined comprises in step S240.

In addition, the method of this embodiment may further comprise:

S210. Determine a transmission mode of data transmission performed by the first device and the second device at least according to the transmission capability of the first device, the transmission mode comprising information associated with using least two MIMO channels for the data transmission performed by the first device and the second device.

The transmission mode may comprise various transmission modes that have been defined by existing wireless networks, and by taking LTE-A as an example, nine transmission modes are specified. In one possible implementation, the information associated with using at least two MIMO channels for the data transmission performed by the first device and the second device may serve as additional parameters in the various existing transmission modes in any suitable manner. In another possible implementation, a new transmission mode can be defined, and the transmission mode itself may be: using at least two MIMO channels for data transmission. Correspondingly, the transmission modes that can be supported by the first device comprised in the transmission capability of the first device may further comprise the new transmission mode, that is, the first device supports capability of using at least two MIMO channels for data transmission.

At least two MIMO channels available can be determined after it is determined that the at least two MIMO channels can be used between the first device and the second device for data transmission.

When the body performing the method of this embodiment is a third-party device independent of the first device and/or the second device, such method of this embodiment further comprises:

S211. Send the transmission mode; specifically, the transmission mode is sent in a manner that it can be received by the first device and/or the second device.

When the body performing the method of this embodiment is a second device, or a third-party device independent of the first device and the second device, or the first device and the second device are both AT devices, step S220 further comprises:

S222. Acquire information associated with the transmission capability of the first device. For example, (when the body performing the method of this embodiment is a third-party device independent of the first device and the second device), the information is acquired from the first device, or from the second device, or from (when the first device and the second device are both AT devices) another device (for example, an AP device that the first device has accessed). The body performing the method of this embodiment determines the transmission capability of the first device according to such information.

If the body performing the method of this embodiment is the first device or belongs to the first device, the transmission capability of the first device can be directly determined in step S220.

Moreover, if the body performing the method of this embodiment is the first device or another device independent of the first device and the second device, the method of this embodiment further comprises the following step:

S250. Determine transmission capability of the second device.

It is feasible to acquire information associated with the transmission capability of the second device directly from the second device or another device associated with the second device and then determine the transmission capability of the second device. For example, when the second device is also an AT device, the information can be acquired through an AP device that the second device has accessed. Alternatively, if the second device is an AP device, the transmission capability thereof can be acquired from the second device when the first device and the second device establish a connection. That is, step S250 may comprise:

S252. Acquire information associated with the transmission capability of the second device.

In such an implementation, in step S240, the transmission configuration is determined at least according to the transmission capability of the first device and the transmission capability of the second device. Alternatively, the transmission configuration is determined at least according to the transmission capability of the first device and the transmission capability of the second device as well as (as stated above) data transmission demands and/or channel state information between the first device and the second device.

When the body performing the method of this embodiment is a third-party device independent of the first device and/or the second device, the method of this embodiment further comprises:

S260. Send the transmission configuration. Specifically, the transmission configuration is sent in a manner in which it can be received by the first device and/or the second device.

By taking a LTE system as an example, information of the transmission configuration can be sent by being placed in a message or control instruction related to radio resource control (RRC) from an upper layer, for example, sent by being placed in a RRC reconfiguration message.

Figure 3:
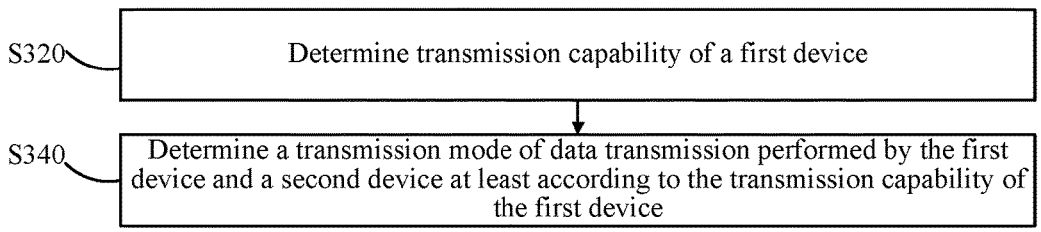
FIG. 3 is an exemplary flowchart of a transmission control method according to a second embodiment of the present application.

Now referring to FIG. 3, FIG. 3 is a flowchart of an exemplary transmission control method according to a second embodiment of the present application. This method may be executed by a first device, by a second device, or by a third-party device independent of the first device and the second device. As shown in FIG. 3, the method comprises:

S320. Determine transmission capability of a first device.

In the method of this embodiment, the transmission capability of the first device may comprise antenna configuration of the first device and transmission modes that can be supported by the first device. The antenna configuration of the first device may comprise the number of antennas that the first device has or can use, and how many receiving antennas, how many transmitting antennas there may be and so on. The transmission modes refer to data transmission manners, for example, spatial diversity, Beamforming and the like, transmission modes specified for different networks may be different, and by taking LTE-A as an example, nine transmission modes are specified.

S340. Determine a transmission mode of data transmission performed by the first device and a second device at least according to the transmission capability of the first device, the transmission mode comprising information associated with using at least two MIMO channels for the data transmission performed by the first device and the second device. That is, it is determined that the first device and the second device can use at least two MIMO channels for data transmission.

To sum up, the method of this embodiment supports that at least two separate MIMO channels coexist during data transmission between the first device and the second device.

In one possible implementation, the transmission mode may comprise various transmission modes that have been defined by existing wireless networks, and the information associated with using at least two MIMO channels for the data transmission performed by the first device and the second device may serve as additional parameters in the various existing transmission modes in any suitable manner. In another possible implementation, a new transmission mode can be defined, and the transmission mode itself may be: using at least two MIMO channels for data transmission. Correspondingly, the transmission modes that can be supported by the first device comprised in the transmission capability of the first device may further comprise the new transmission mode, that is, the first device supports capability of using at least two MIMO channels for data transmission.

When the body performing the method of this embodiment is a third-party device independent of the first device and/or the second device, the method of this embodiment further comprises:

S310. Send the transmission mode; specifically, the transmission mode is sent in a manner in which it can be received by the first device and/or the second device.

After the transmission mode for the data transmission between the first device and the second device is determined, the method of this embodiment may further comprise:

S360. Determine transmission configuration between the first device and the second device at least according to the transmission capability of the first device, the transmission configuration comprising information associated with at least two MIMO channels available for data transmission between the first device and the second device.

According to the role played by the body performing the method of this embodiment, the determination can be used to establish the at least two MIMO channels between the first device and the second device, and can also be used to establish a new MIMO channel and/or modify a MIMO channel currently used during the data transmission between the first device and the second device.

In one possible implementation, it is possible that at least one part of antennas, which belong to the first device, in the antennas consisting of the at least two MIMO channels are the same, that is, part or all of antennas of the first device comprised in at least two of the at least two MIMO channels may be same. In such an implementation, such at least two MIMO channels may occupy different time resources, for example, in a TDD LTE system employing the method of this embodiment, a terminal has four antennas, two MIMO channels exist between an eNode B and a terminal device, the two MIMO channels comprise all the four antennas of the terminal, one MIMO channel is configured to receive downlink signals, and the other one is configured to send uplink signals; in order to achieve better transmission efficiency, the two MIMO channels can be defined to use different transmission modes, for example, one performs transmission in a manner of spatial diversity, and the other performs transmission in a manner of Beamforming; or the two MIMO channels can send different data streams at different times. The at least two MIMO channels coexisting may be determined before the first device and the second device begin to perform data transmission, so as to save the time on waiting during the process of data transmission and performing MIMO channel reconfiguration according to CQIs reported by the first device, and, although the same antenna may be included in different MIMO channels, for a corresponding upper layer, each MIMO channel is an independent channel, and the upper layer can configure the MIMO channel, such as allocating an encoding matrix thereto can be defined to.

In another possible implementation, all the antennas of the first device comprised in at least two of the at least two MIMO channels may be different, that is, each of such at least two MIMO channels only comprises part of the antennas of the first device, which greatly reduces computational complexity of the AT and reduces device power consumption. This is because: for the MIMO system as shown in FIG. 1, for example, in a closed-loop spatial multiplexing transmission mode, a user terminal needs to feed back an Rank Indicator (RI), a PMI, and a CQI to a base station. The base station, according to the feedback of the user terminal and some other reference factors, such as data to be transmitted, allocates a corresponding transmission mode to the user terminal. For a $N_T \times N_R$ MIMO channel, the terminal needs to estimate a $N_R \times N_R$ channel matrix while calculating the RI, and after the matrix is transformed, a rank of the matrix is the value of the RI. The computational complexity of the whole process is the square of $N_R$. Similarly, multiple codebooks with a maximum index of $N_R \times N_R$ may usually be designed in a LTE standard, and the RI selects an optimal codeword therefrom according to channel conditions and the like, then reports the corresponding index to the base station. The computational complexity of this process is also the square of $N_R$. In such an implementation of this embodiment, each MIMO channel only comprises part of the antennas, and the computational complexity is relatively lower.

It should be noted that, the antennas comprised in each MIMO channel can be determined according to any suitable technology, for devices on either side (the first device and the second device), for example, the antennas comprised in each MIMO channel should be determined on the premise of reducing correlation between the antennas as much as possible, and antennas having a certain spatial distance are selected, which is a mature prior art and is not repeated herein.

To sum up, the method of this embodiment supports that at least two separate MIMO channels coexist between an AT device and an AP device as well as between two AT devices, which has flexible configuration while ensuring a higher data transmission rate, and computational complexity is not high for the devices, which can reduce power consumption of the devices.

In addition, the transmission configuration determined in step S360 may be determined before the first device and the second device perform data transmission, and may also be determined during the data transmission between the first device and the second device, comprising: determining at least one MIMO channel before the first device and the second device perform data transmission, and establishing the at least one MIMO channel between the first device and the second device; during the data transmission, determining at least one other MIMO channel or re-determining at least two MIMO channels, and establishing the at least one other MIMO channel or re-determining the at least two MIMO channels, to cause that at least two MIMO channel coexist during the data between the first device and the second device. According to different factors such as time and effect of the determination, in one possible implementation, step S360 comprises:

S362. Determine the transmission configuration at least according to the transmission capability of the first device and data transmission demands between the first device and the second device.

The data transmission demands may comprise at least one of the following: QoS requirements of data transmission, transmission rate requirements, user preference and so on. Such an implementation may be applied before the data transmission or applied during the data transmission. For example, the data transmission demands change during the data transmission, and in response to this, the system can determine the remaining at least one MIMO channel and/or reconfigures a current MIMO channel adaptively.

In another possible implementation, step S360 may comprise:

S364. Determine the transmission configuration at least according to the transmission capability of the first device and channel state information between the first device and the second device.

That is, before the data transmission, in addition to the transmission capability of the first device, a channel state between the first device and the second device can be considered comprehensively, to determine suitable MIMO channels of which at least channel condition is suitable for transmitting data to be transmitted; during the data transmission, if a channel condition changes, it is possible that the current MIMO channel can no longer meet transmission demands of current data, and the transmission configuration is determined in response to this, thus selecting suitable MIMO channels.

In such an implementation, the method of this embodiment further comprises:

S350: Determine the channel state information between the first device and the second device.

According to different transmission scenarios, there are different ways to determine the channel state information, by taking a LTE system as an example, when uplink scheduling is performed by the eNode B, the user terminal needs to transmit a SRS, to allow the eNode B to perform channel estimation, and in such an implementation, step S350 may comprise:

S352. Determine the channel state information at least according to a SRS sent from the first device to the second device.

When the eNode B performs downlink scheduling, the user terminal may feed back CQIs, Rank Indicators (PMIs are further comprised in the case of closed-loop spatial diversity) and other information, to support the eNode B to perform adaptive code modulation, precoding, channel estimation and so on, and in such an implementation, step S350 may comprise:

S354. Determine the channel state information between the first device and the second device at least according to CQIs and/or Rank Indicators of at least part of all possible wireless channels between the first device and the second device sent from the first device to the second device. The all possible wireless channels refer to channels that can be formed between each transmitting antenna and each receiving antenna, comprising allocated wireless channels configured to perform data transmission between the first device and the second device, wireless channels allocated to other devices and idle wireless channels. Channel state information of all wireless channels can be determined according to CQIs and/or Rank Indicators and other information of at least part of all the wireless channels, and suitable MIMO channels may be determined. In one possible implementation, the at least part of all possible wireless channels comprise wireless channels not currently used for data transmission.

In the implementation where one or more MIMO channels between the first device and the second device have been determined, step S350 may further comprise:

S356. Determine the channel state information associated with at least one MIMO channel at least according to CQIs and/or Rank Indicators associated with the at least one MIMO channel sent from the first device to the second device. The at least one MIMO channel is a MIMO channel that has been used for data transmission between the first device and the second device, and according to channel state information of the MIMO channel that has been used, it can be determined whether the MIMO channel is still qualified for transmission demands of data currently transmitted and whether it is necessary to establish at least one other MIMO channel, including adding MIMO channels and reconfiguring existing MIMO channels.

In the implementation where the first device is an AT device and the second device is an AP device, antenna allocation of the AT device is a mature prior art and is not a limitation to the technical solution of this embodiment; in the methods of this embodiment, in order to support multiple MIMO channels between the first device and the second device, multiple antennas of the first device have capability of grouping or have been divided into multiple antenna groups, each of which comprises at least one antenna. Therefore, step S360 is mainly configured to determine antenna groups of the first device comprised in each of the at least two MIMO channels available for data transmission between the first device and the second device, at least according to the transmission capability of the first device. That is, the antenna configuration of the first device determined in step S320 further comprises the number of antennas that the first device has and the first device's capability of dividing the antennas into at least two antenna groups, and the body performing the method of this embodiment determines which antennas each of the at least two MIMO channels comprises in step S360. Alternatively, the antenna configuration of the first device determined in step S320 may directly comprise a grouping situation where the antennas are divided into at least two antenna groups, that is, the grouping situation of the first device is known, and the body performing the method of this embodiment determines which antenna groups each of the MIMO channels determined comprises in step S360.

When the body performing the method of this embodiment is a second device, or a third-party device independent of the first device and the second device, or the first device and the second device are both AT devices, step S320 further comprises:

S322. Acquire information associated with the transmission capability of the first device. For example, (when the body performing the method of this embodiment is a third-party device independent of the first device and the second device), the information is acquired from the first device, or from the second device, or from (when the first device and the second device are both AT devices) another device (for example, an AP device that the first device has accessed). The body performing the method of this embodiment determines the transmission capability of the first device according to such information.

If the body performing the method of this embodiment is the first device or belongs to the first device, the transmission capability of the first device can be directly determined in step S320.

Moreover, if the body performing the method of this embodiment is the first device or another device independent of the first device and the second device, the method of this embodiment further comprises the following step:

S370. Determine transmission capability of the second device.

It is feasible to acquire information associated with the transmission capability of the second device directly from the second device or another device associated with the second device and then determine the transmission capability of the second device. For example, when the second device is also an AT device, the information can be acquired through an AP device that the second device has accessed. Alternatively, if the second device is an AP device, the transmission capability thereof can be acquired from the second device when the first device and the second device establish a connection. That is, step S370 may comprise:

S372. Acquire information associated with the transmission capability of the second device.

In such an implementation, in step S360, the transmission configuration is determined at least according to the transmission capability of the first device and the transmission capability of the second device. Alternatively, the transmission configuration is determined at least according to the transmission capability of the first device and the transmission capability of the second device as well as (as stated above) data transmission demands and/or channel state information between the first device and the second device.

When the body performing the method of this embodiment is a third-party device independent of the first device and/or the second device, the method of this embodiment further comprises:

S380. Send the transmission configuration. Specifically, the transmission configuration is sent in a manner in which it can be received by the first device and/or the second device. By taking a LTE system as an example, information of the transmission configuration can be sent by being placed in a message or control instruction related to RRC from an upper layer, for example, sent by being placed in a RRC reconfiguration message.

To sum up, the method of this embodiment supports that at least two separate MIMO channels coexist between an AT device and an AP device as well as between two AT devices, and can flexibly configure the at least two MIMO channels according to data transmission demands and the like, thus having higher data transmission efficiency.

Figure 4:
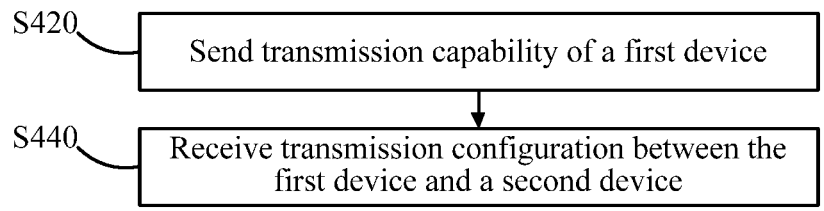
FIG. 4 is an exemplary flowchart of a transmission control method according to a third embodiment of the present application.

FIG. 4 is a flowchart of an exemplary transmission control method according to a third embodiment of the present application. The method is executed by a first device or an apparatus that belongs to the first device. As shown in FIG. 4, the method comprises:

S420. Send transmission capability of a first device.

In a method of this embodiment, the transmission capability of the first device may comprise antenna configuration of the first device and transmission modes that can be supported by the first device. The antenna configuration of the first device may comprise the number of antennas that the first device has or can use, and how many receiving antennas, how many transmitting antennas there may be and so on. The transmission modes refer to data transmission manners, for example, spatial diversity, Beamforming and the like, transmission modes specified for different networks may be different, and by taking LTE-A as an example, nine transmission modes are specified.

S440. Receive transmission configuration between the first device and a second device, the transmission configuration being at least related to the transmission capability of the first device, and comprising information associated with at least two MIMO channels available for data transmission between the first device and the second device.

With reference to the description in the method of the first embodiment, the transmission configuration being at least related to the transmission capability of the first device comprises: the transmission configuration is determined at least according to the transmission capability of the first device. The determination can be used to establish the at least two MIMO channels between the first device and the second device, and can also be used to establish a new MIMO channel and/or modify a MIMO channel currently used during the data transmission between the first device and the second device. In addition, the MIMO channel refers to, for example, a general term of $N_T \times N_R$ channels formed between $N_T$ transmitting antennas and $N_R$ receiving antennas, wherein at least one of $N_T$ and $N_R$ is greater than 1. A channel between each pair of transmitting antenna and receiving antenna is called a sub-channel of the MIMO channel.

The method of this embodiment supports that at least two separate MIMO channels coexist in a process that the first device and the second device perform data transmission.

With reference to the description in the method of the first embodiment, in one possible implementation, in the transmission configuration, it is possible that at least part of antennas, which belong to the first device, in the antennas included in the at least two MIMO channels are the same, that is, part of or all of the antennas of the first device comprised in at least two of the at least two MIMO channels may be the same. In such an implementation, such at least two MIMO channels may occupy different time resources and use different transmission modes; or the two MIMO channels may send different data streams at different times. The at least two MIMO channels coexisting may be determined before the first device and the second device begin to perform data transmission. In another possible implementation, antennas of the first device comprised in at least two of the at least two MIMO channels in the transmission configuration may be all different, that is, each of the at least two MIMO channels only comprises part of the antennas of the first device, which greatly reduces computational complexity of the AT and reduces device power consumption.

To sum up, the method of this embodiment supports that at least two separate MIMO channels coexist between an AT device and an AP device as well as between two AT devices, which has flexible configuration while ensuring a higher data transmission rate, and computational complexity is not high for the devices, which can reduce power consumption of the devices.

Still with reference to the description in the method of the first embodiment, the transmission configuration may be determined before the first device and the second device perform data transmission, and may also be determined during the data transmission between the first device and the second device, comprising: determining at least one MIMO channel before the first device and the second device perform data transmission, and establishing the at least one MIMO channel between the first device and the second device; during the data transmission, determining at least one other MIMO channel or re-determining at least two MIMO channels, and establishing the at least one other MIMO channel or re-determining the at least two MIMO channels, to cause that at least two MIMO channel coexist during the data transmission between the first device and the second device. According to different factors such as time and effect of the determination, in one possible implementation, the transmission configuration is at least related to the transmission capability of the first device and data transmission between the first device and the second device, for example, the transmission configuration is determined at least according to the transmission capability of the first device and data transmission demands between the first device and the second device. The data transmission demands may comprise at least one of the following: QoS requirements of data transmission, transmission rate requirements, user preference and so on. For example, the transmission configuration is determined like this: the data transmission demands change during the data transmission, and in response to this, the system can determine the remaining at least one MIMO channel and/or reconfigures a current MIMO channel adaptively.

In another possible implementation, the transmission configuration is at least related to the transmission capability of the first device and channel state information between the first device and the second device, for example, the transmission configuration is determined at least according to the transmission capability of the first device and channel state information between the first device and the second device. Specifically, the transmission configuration may be determined before the data transmission, in addition to the transmission capability of the first device, determination of the transmission configuration comprehensively considers a channel state between the first device and the second device, and the determined MIMO channels are channels of which at least channel condition is suitable; the transmission configuration may also be determined in response to a change in a channel condition during data transmission, and the change in the channel condition comprises: for example, the current MIMO channel can no longer meet current data transmission demands.

According to different transmission scenarios, in order to provide reference for determining the channel state information, a LTE system is taken as an example, when uplink scheduling is performed by the eNode B, the user terminal needs to transmit a SRS, to allow the eNode B to perform channel estimation, and in such an implementation, the method of this embodiment may comprise:

S430: Send a SRS to the second device.

In another implementation, the LTE system is still taken as an example, when the eNode B performs downlink scheduling, the user terminal may feedback CQIs, Rank Indicators (PMIs are further comprised in the case of closed-loop spatial diversity) and other information, to support the eNode B to perform adaptive code modulation, precoding, channel estimation and so on, and in such an implementation, the method of this embodiment may comprise:

S430'. Send to the second device CQIs and/or Rank Indicators of at least part of all possible wireless channels between the first device and the second device.

The all possible wireless channels refer to channels that can be formed between each transmitting antenna and each receiving antenna, comprising allocated wireless channels configured to perform data transmission between the first device and the second device, wireless channels allocated to other devices and idle wireless channels. Channel state information of all wireless channels can be determined according to CQIs, Rank Indicators and other information of at least part of all the wireless channels, and suitable MIMO channels are determined. In one possible implementation, the at least part of all possible wireless channels comprises wireless channels not used for data transmission currently.

Alternatively, the method of this embodiment may comprise:

S430". Send to the second device CQIs and/or Rank Indicators associated with at least one MIMO channel.

The at least one MIMO channel is a MIMO channel that has been used for data transmission between the first device and the second device, and according to channel state information of the MIMO channel that has been used, it can be determined whether the MIMO channel is still qualified for transmission demands of data currently transmitted, and whether it is necessary to establish at least one other MIMO channels, comprising adding MIMO channels and reconfiguring existing MIMO channels.

In the implementation where the first device is an AT device and the second device is an AP device, in order to support multiple MIMO channels between the first device and the second device, multiple antennas of the first device have capability of grouping or have been divided into multiple antenna groups, each of which comprises at least one antenna. In the method of this embodiment, the antenna configuration comprises the number of antennas that the first device has and the first device's capability of dividing the antennas into at least two antenna groups, and the transmission configuration comprises which antennas each of the at least two MIMO channels comprises; or the antenna configuration comprises the number of antennas that the first device has and the first device's capability of dividing the antennas into at least two antenna groups, and the transmission configuration comprises which antenna group each MIMO channel determined comprises.

In addition, the method of this embodiment further comprises:

S410. Receive a transmission mode of data transmission performed by the first device and the second device, the transmission mode being at least related to the transmission capability of the first device, and the transmission mode comprising information associated with using the at least two MIMO channels for the data transmission performed by the first device and the second device.

The transmission mode may comprise various transmission modes that have been defined by existing wireless networks, and by taking LTE-A as an example, nine transmission modes are specified. In one possible implementation, the information associated with using at least two MIMO channels for the data transmission performed by the first device and the second device may serve as additional parameters in the various existing transmission modes in any suitable manner. In another possible implementation, a new transmission mode can be defined, and the transmission mode itself is: using at least two MIMO channels for data transmission. Correspondingly, the transmission modes that can be supported by the first device comprised in the transmission capability of the first device may further comprise the new transmission mode, that is, the first device supports capability of using at least two MIMO channels for data transmission.

Moreover, as described in the methods of the first embodiment, the transmission configuration may be sent by being placed in a message or control instruction related to RRC from an upper layer, and correspondingly, step S440 of this embodiment may comprise:

S442. Receive a message or control instruction related to RRC from an upper layer, the message or control instruction being a RRC reconfiguration message.

To sum up, the method of this embodiment can assist in achieving that at least two separate MIMO channels coexist between an AT device and an AP device as well as between two AT devices.

Figure 5:
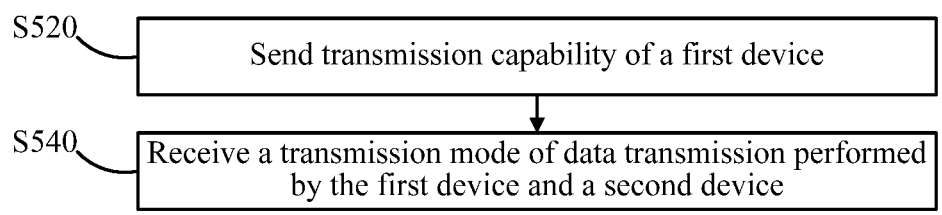
FIG. 5 is an exemplary flowchart of a transmission control method according to a fourth embodiment of the present application.

FIG. 5 is a flowchart of an exemplary transmission control method according to a fourth embodiment of the present application. The method is executed by a first device or an apparatus that belongs to the first device. As shown in FIG. 5, the method comprises:

S520. Send transmission capability of a first device.

In a method of this embodiment, the transmission capability of the first device may comprise antenna configuration of the first device and transmission modes that can be supported by the first device. The antenna configuration of the first device may comprise the number of antennas that the first device has or can use, and how many receiving antennas, how many transmitting antennas there may be and so on. The transmission modes refer to data transmission manners, for example, spatial diversity, Beamforming and the like, transmission modes specified for different networks may be different, and by taking LTE-A as an example, nine transmission modes are specified.

S540. Receive a transmission mode of data transmission performed by the first device and a second device, the transmission mode being at least related to the transmission capability of the first device, and the transmission mode comprising information associated with using at least two MIMO channels for the data transmission performed by the first device and the second device. The transmission mode being at least related to the transmission capability of the first device comprises: the transmission mode is determined at least according to the transmission capability of the first device.

To sum up, the method of this embodiment supports that at least two separate MIMO channels coexist during the data transmission between the first device and the second device.

In one possible implementation, the transmission mode may comprise various transmission modes that have been defined by existing wireless networks, and the information associated with using at least two MIMO channels for the data transmission performed by the first device and the second device may serve as additional parameters in the various existing transmission modes in any suitable manner. In another possible implementation, a new transmission mode can be defined, and the transmission mode itself is: using at least two MIMO channels for data transmission.

Correspondingly, the transmission modes that can be supported by the first device comprised in the transmission capability of the first device may further comprise the new transmission mode, that is, the first device supports capability of using at least two MIMO channels for data transmission.

In addition, the method of this embodiment further comprises:

S560. Receive transmission configuration between the first device and the second device, the transmission configuration between the first device and the second device being at least related to the transmission capability of the first device, and the transmission configuration comprising information associated with at least two MIMO channels available for data transmission between the first device and the second device.

With reference to the description in the methods of the second embodiment, the transmission configuration being at least related to the transmission capability of the first device comprises: the transmission configuration is determined at least according to the transmission capability of the first device. The determination can be used to establish the at least two MIMO channels between the first device and the second device, and can also be used to establish a new MIMO channel and/or modify a MIMO channel currently used in a process of performing data transmission between the first device and the second device.

Still with reference to the description in the method of the third embodiment, in one possible implementation, in the transmission configuration, it is possible that at least part of antennas, which belong to the first device, in the antennas consisting of the at least two MIMO channels are the same, that is, part of or all of the antennas of the first device comprised in at least two of the at least two MIMO channels may be the same. In such an implementation, such at least two MIMO channels may occupy different time resources and use different transmission modes; or the two MIMO channels may send different data streams at different times. The at least two MIMO channels coexisting may be determined before the first device and the second device begin to perform data transmission. In another possible implementation, all the antennas of the first device comprised in at least two of the at least two MIMO channels in the transmission configuration may be different, that is, each of such at least two MIMO channels only comprises part of the antennas of the first device, which greatly reduces computational complexity of the AT and reduces device power consumption.

To sum up, the method of this embodiment supports that at least two separate MIMO channels coexist between an AT device and an AP device as well as between two AT devices, which has flexible configuration while ensuring a higher data transmission rate, and computational complexity is not high for the devices, which can reduce power consumption of the devices.

Still with reference to the description in the method of the second embodiment, the transmission configuration may be determined before the first device and the second device perform data transmission, and may also be determined during the data transmission between the first device and the second device, comprising: determining at least one MIMO channel before the first device and the second device perform data transmission, and establishing the at least one MIMO channel between the first device and the second device; during the data transmission, determining at least one other MIMO channel or re-determining at least two MIMO channels, and establishing the at least one other MIMO channel or re-determining the at least two MIMO channels, to cause that at least two MIMO channel coexist during the data transmission between the first device and the second device. According to different factors such as time and effect of the determination, in one possible implementation, the transmission configuration is at least related to the transmission capability of the first device and data transmission between the first device and the second device, for example, the transmission configuration is determined at least according to the transmission capability of the first device and data transmission demands between the first device and the second device.

In another possible implementation, the transmission configuration is at least related to the transmission capability of the first device and channel state information between the first device and the second device, for example, the transmission configuration is determined at least according to the transmission capability of the first device and channel state information between the first device and the second device. Specifically, the transmission configuration may be determined before the data transmission, in addition to the transmission capability of the first device, determination of the transmission configuration comprehensively considers a channel state between the first device and the second device, and the determined MIMO channels are channels of which at least channel condition is suitable; the transmission configuration may also be determined in response to a change in a channel condition during data transmission, and the change in the channel condition may be, for example, that the current MIMO channel can no longer meet transmission demands of current data.

According to different transmission scenarios, in order to provide reference for determining the channel state information, a LTE system is taken as an example, when uplink scheduling is performed by the eNode B, the user terminal needs to transmit a SRS, to allow the eNode B to perform channel estimation, and in such an implementation, the method of this embodiment may comprise:

S550: Send a SRS to the second device.

In another implementation, the LTE system is still taken as an example, when the eNode B performs downlink scheduling, the user terminal may feedback CQIs, Rank Indicators (PMIs are further comprised in the case of closed-loop spatial diversity) and other information, to support the eNode B to perform adaptive code modulation, precoding, channel estimation and so on, and in such an implementation, the method of this embodiment may comprise:

S550'. Send to the second device CQIs and/or Rank Indicators of at least part of all possible wireless channels between the first device and the second device, and determine the channel state information between the first device and the second device.

The all possible wireless channels refer to channels that can be formed between each transmitting antenna and each receiving antenna, comprising allocated wireless channels configured to perform data transmission between the first device and the second device, wireless channels allocated to other devices and idle wireless channels. Channel state information of all wireless channels can be determined according to CQIs, Rank Indicators and other information of all the wireless channels, and suitable MIMO channels are determined. The at least part of all possible wireless channels comprises wireless channels not used by current data transmission. The transmission mode is at least related to the transmission capability of the first device.

Alternatively, the method of this embodiment may comprise:

S550": Send to the second device CQIs and/or Rank Indicators associated with at least one MIMO channel.

The at least one MIMO channel is a MIMO channel that has been used for data transmission between the first device and the second device, and according to channel state information of the MIMO channel that has been used, it can be determined whether the MIMO channel is still qualified for transmission demands of data currently transmitted and whether it is necessary to establish at least one other MIMO channels, comprising adding MIMO channels and reconfiguring existing MIMO channels.

In the implementation where the first device is an AT device and the second device is an AP device, in order to support multiple MIMO channels between the first device and the second device, multiple antennas of the first device have capability of grouping or have been divided into multiple antenna groups, each of which comprises at least one antenna. In the method of this embodiment, the antenna configuration comprises the number of antennas that the first device has and the first device's capability of dividing the antennas into at least two antenna groups, and the transmission configuration comprises which antennas each of the at least two MIMO channels comprises; or the antenna configuration comprises the number of antennas that the first device has and the first device's capability of dividing the antennas into at least two antenna groups, and the transmission configuration comprises which antenna group each MIMO channel determined comprises.

Moreover, as described in the methods of the third embodiment, the transmission configuration may be sent by being placed in a message or control instruction related to RRC from an upper layer, and correspondingly, step S560 of this embodiment may comprise:

S562. Receive a message or control instruction related to RRC from an upper layer, the message or control instruction being a RRC reconfiguration message.

To sum up, the method of this embodiment can assist in achieving that at least two separate MIMO channels coexist between an AT device and an AP device as well as between two AT devices.

It should be understood by those skilled in the art that, in any one of the foregoing methods of the specific implementations of the present application, the value of the serial number of each step described above does not mean an execution sequence, and the execution sequence of each step should be determined according to the function and internal logic thereof, and should not be any limitation to the implementation procedure of the specific implementations of the present application.

In addition, an embodiment of the present application further provides a computer readable medium, comprising computer readable instructions that perform the following operation when being executed: executing operations of the steps of the method in the implementation shown in any one of FIG. 2 to FIG. 5.

Figure 6A:
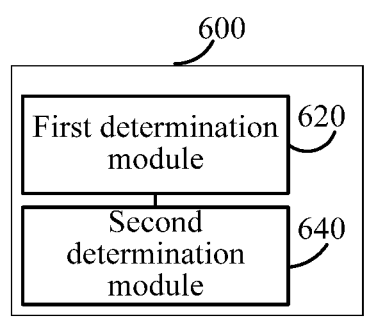
FIG. 6(a) to FIG. 6(l) are exemplary structural block diagrams of a transmission control apparatus according to a first embodiment of the present application.
Figure 6B:
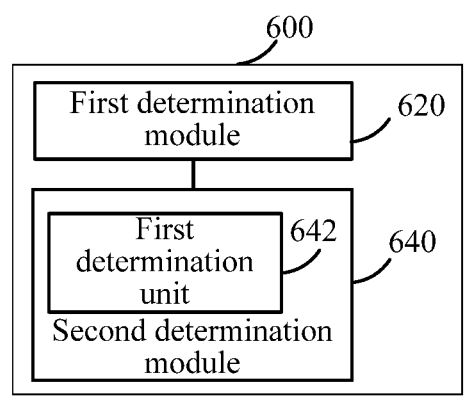
Figure 6C:
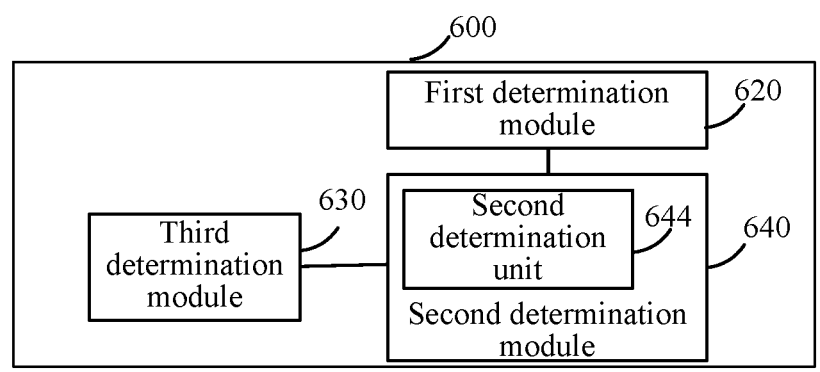
Figure 6D:
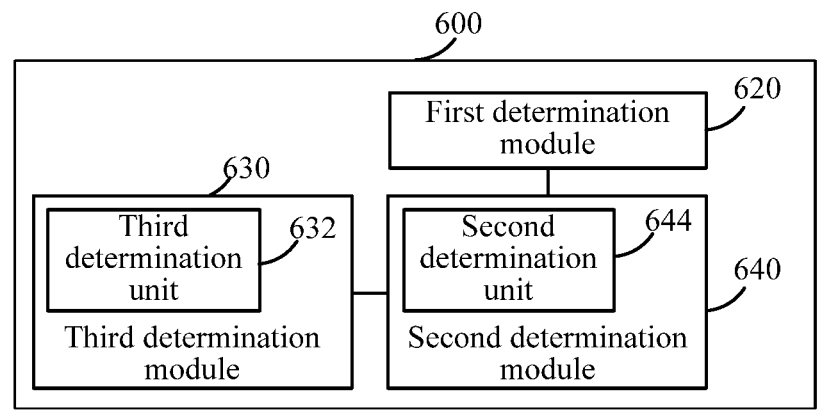
Figure 6E:
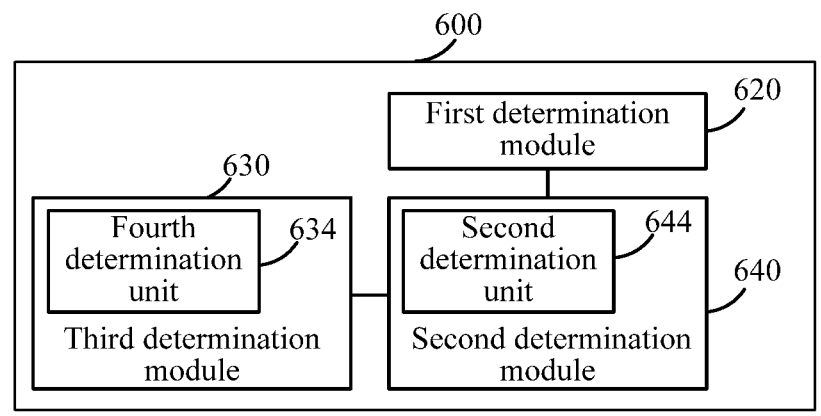

Referring to FIG. 6(a), FIG. 6(a) is a structural block diagram of an exemplary transmission control apparatus according to a first embodiment of the present application. The apparatus may belong to or be a first device, or belong to or be a second device, or be a third-party device independent of the first device and the second device. According to requirements of different roles of the apparatus, in addition to components described below, the apparatus may further comprise a communication module that achieves communication between any devices outside the apparatus according to requirements. As shown in FIG. 6(a), the apparatus 600 comprises:

A first determination module 620, configured to determine transmission capability of a first device.

In the apparatus of this embodiment, the transmission capability of the first device may comprise antenna configuration of the first device and transmission modes that can be supported by the first device. The antenna configuration of the first device may comprise the number of antennas that the first device has or can use, and how many receiving antennas, how many transmitting antennas there may be and so on. The transmission modes refer to data transmission manners, for example, spatial diversity, Beamforming and the like, transmission modes specified for different networks may be different, and by taking LTE-A as an example, nine transmission modes are specified.

A second determination module 640, configured to determine transmission configuration between the first device and a second device at least according to the transmission capability of the first device, the transmission configuration comprising information associated with at least two MIMO channels available for data transmission between the first device and the second device.

According to the roles of the apparatus of this embodiment, the determination can be used to establish the at least two MIMO channels between the first device and the second device, and can also be used to establish a new MIMO channel and/or modify a MIMO channel currently used in a process of performing data transmission between the first device and the second device. In addition, the MIMO channel refers to, for example, a general term of $N_T \times N_R$ channels formed between $N_T$ transmitting antennas and $N_R$ receiving antennas, wherein at least one of $N_T$ and $N_R$ is greater than 1. A channel between each pair of transmitting antenna and receiving antenna is called a sub-channel of the MIMO channel.

The apparatus of this embodiment supports that at least two separate MIMO channels coexist during data transmission between the first device and the second device.

In one possible implementation, it is possible that at least part of antennas, which belong to the first device, in the antennas forming the at least two MIMO channels are the same, that is, part or all of antennas of the first device comprised in the at least two MIMO channels may be the same. In such an implementation, such at least two MIMO channels may occupy different time resources, for example, in a TDD LTE system employing the method of this embodiment, a terminal has four antennas, two MIMO channels exist between an eNode B and a terminal device, the two MIMO channels comprise all the four antennas of the terminal, one MIMO channel is configured to receive downlink signals, and the other one is configured to send uplink signals; in order to achieve better transmission efficiency, the two MIMO channels can be defined to use different transmission modes, for example, one performs transmission in a manner of spatial diversity, and the other performs transmission in a manner of Beamforming; or the two MIMO channels can send different data streams at different times. The at least two MIMO channels coexisting may be determined before the first device and the second device begin to perform data transmission, so as to save the time on waiting during the process of data transmission and performing MIMO channel reconfiguration according to CQIs reported by the first device, and, although the same antenna may be included in different MIMO channels, for a corresponding upper layer, each MIMO channel is an independent channel, and the upper layer can configure the MIMO channel, such as allocating an encoding matrix thereto flexibly.

In another possible implementation, all the antennas of the first device comprised in at least two of the at least two MIMO channels may be different, that is, each of such at least two MIMO channels only comprises part of the antennas of the first device, which greatly reduces computational complexity of the AT and reduces device power consumption. This is because: for the MIMO system as shown in FIG. 1, for example, in a closed-loop spatial multiplexing transmission mode, a user terminal needs to feed back an Rank Indicator (RI), a PMI, and a CQI to a base station. The base station, according to the feedback of the user terminal and some other reference factors, such as data to be transmitted, allocates a corresponding transmission mode to the user terminal. For a $N_T \times N_R$ MIMO channel, the terminal needs to estimate a $N_R \times N_R$ channel matrix while calculating the RI, and after the matrix is transformed, a rank of the matrix is the value of the RI. The computational complexity of the whole process is the square of $N_R$. Similarly, multiple codebooks with a maximum index of $N_R \times N_R$ may be designed in a LTE standard, and the RI selects an optimal codeword therefrom according to channel conditions and the like, and then reports the corresponding index to the base station. The computational complexity of this process is also the square of $N_R$. In such an implementation of this embodiment, each MIMO channel only comprises part of the antennas, and the computational complexity is relatively lower.

It should be noted that, the second determination module 440 can determine antennas comprised in each MIMO channel according to any suitable technology, for any side device (the first device and the second device), for example, the antennas comprised in each MIMO channel should be determined on the premise of reducing correlation between the antennas as much as possible, and antennas having a certain spatial distance may be selected, which is a mature prior art and is not repeated herein.

To sum up, the apparatus of this embodiment supports that at least two separate MIMO channels coexist between an AT device and an AP device as well as between two AT devices, which has flexible configuration while ensuring a higher data transmission rate, and computational complexity is not high for the devices, which can reduce power consumption of the devices.

In addition, the transmission configuration may be determined by the second determination module 640 before the first device and the second device perform data transmission, and may also be determined by the second determination module 440 during the data transmission between the first device and the second device, comprising: determining at least one MIMO channel before the first device and the second device perform data transmission, and establishing the at least one MIMO channel between the first device and the second device; during the data transmission, determining at least one other MIMO channel or re-determining at least two MIMO channels, and establishing the at least one other MIMO channel or re-determining the at least two MIMO channels, to cause that at least two MIMO channel coexist during the data transmission between the first device and the second device. As shown in FIG. 6(*b*), in one possible implementation, the second determination module 640 comprises:

A first determination unit 642, configured to determine the transmission configuration at least according to the transmission capability of the first device and data transmission demands between the first device and the second device.

The data transmission demands may comprise at least one of the following: QoS requirements of data transmission, transmission rate requirements, user preference and so on. Such an implementation is applicable before the data transmission or during the data transmission. For example, the data transmission demands change during the data transmission, and in response to this, the first determination unit 442 can determine the remaining at least one MIMO channel and/or reconfigures a current MIMO channel adaptively.

As shown in FIG. 6(*c*), in another possible implementation, the second determination module 640 may comprise:

A second determination unit 644, configured to determine the transmission configuration at least according to the transmission capability of the first device and channel state information between the first device and the second device.

That is, before the data transmission, in addition to the transmission capability of the first device, the second determination unit 644 can comprehensively consider a channel state between the first device and the second device, to determine suitable MIMO channels of which at least channel condition is suitable for transmitting data to be transmitted; during the data transmission, if a channel condition changes, it is possible that the current MIMO channel can no longer meet transmission demands of current data, and the transmission configuration is determined in response to this, and suitable MIMO channels are selected.

In such an implementation, the apparatus 600 of this embodiment further comprises:

A third determination module 630, configured to determine the channel state information between the first device and the second device.

According to different transmission scenarios, there are different ways to determine the channel state information, by taking a LTE system as an example, when uplink scheduling is performed by the eNode B, the user terminal needs to transmit a sounding reference signal (SRS), to allow the eNode B to perform channel estimation. As shown in FIG. 6(*d*), in such an implementation, the third determination module 630 may comprise:

A third determination unit 632, configured to determine the channel state information at least according to a SRS sent by the first device to the second device.

When the eNode B performs downlink scheduling, the user terminal may feed back CQIs, Rank Indicators (PMIs are further comprised in the case of closed-loop spatial diversity) and other information, to support the eNode B to perform adaptive code modulation, precoding, channel estimation and so on, and as shown in FIG. 6(*e*), in such an implementation, the third determination module 630 may comprise:

A fourth determination unit 634, configured to determine the channel state information between the first device and the second device at least according to Channel Quality Indicators (CQIs) and/or Rank Indicators of at least part of all possible wireless channels between the first device and the second device sent from the first device to the second device. The all possible wireless channels refer to channels that can be formed between each transmitting antenna and each receiving antenna, comprising allocated wireless channels configured to perform data transmission between the first device and the second device, wireless channels allocated to other devices and idle wireless channels. Channel state information of all wireless channels can be determined according to CQIs and/or Rank Indicators and other information of at least part of all the wireless channels, and suitable MIMO channels are determined. In one possible implementation, the at least part of all possible wireless channels comprises wireless channels not for data transmission currently.

Figure 6F:
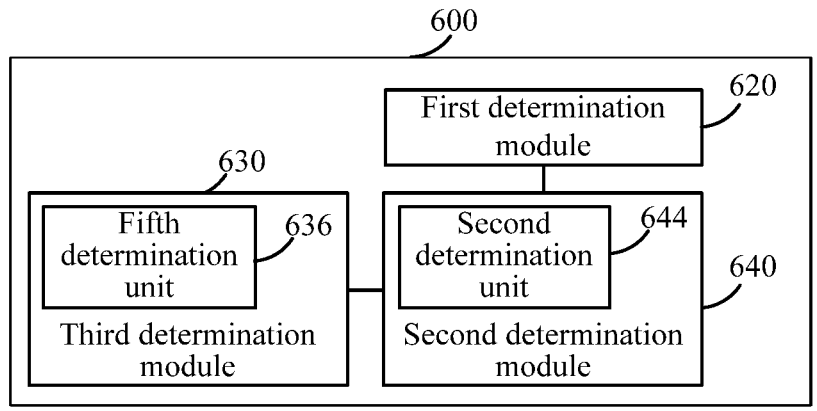

In the implementation where one or more MIMO channels between the first device and the second device have been determined, as shown in FIG. 6(f), in such an implementation, the third determination module 630 may further comprise:

A fifth determination unit 636, configured to determine the channel state information associated with at least one MIMO channel at least according to Channel Quality Indicators (CQIs) and/or Rank Indicators associated with the at least one MIMO channel sent from the first device to the second device. The at least one MIMO channel is a MIMO channel that has been used for data transmission between the first device and the second device, and according to channel state information of the MIMO channel that has been used, it can be determined whether the MIMO channel is still qualified for transmission demands of data currently transmitted and whether it is necessary to establish at least one other MIMO channels, such as adding MIMO channels and reconfiguring existing MIMO channels.

In the implementation where the first device is an AT device and the second device is an AP device, antenna allocation of the AT device is a mature prior art and is not a limitation to the technical solution of this embodiment; in the apparatus of this embodiment, in order to support multiple MIMO channels between the first device and the second device, multiple antennas of the first device have capability of grouping or have been divided into multiple antenna groups, each of which comprises at least one antenna. Therefore, the second determination module 640 is mainly configured to determine antenna groups of the first device comprised in each of the at least two MIMO channels available for data transmission between the first device and the second device at least according to the transmission capability of the first device. That is, the antenna configuration of the first device determined by the first determination module 620 further comprises the number of antennas that the first device has and the first device's capability of dividing the antennas into at least two antenna groups, and the second determination module 640 determines which antennas each of the at least two MIMO channels comprises. Alternatively, the antenna configuration of the first device determined by the first determination module 620 may directly comprise a grouping situation where the antennas are divided into at least two antenna groups, that is, the grouping situation of the first device is known, and the second determination module 640 determines which antenna groups each of the MIMO channels determined comprises.

Figure 6G:
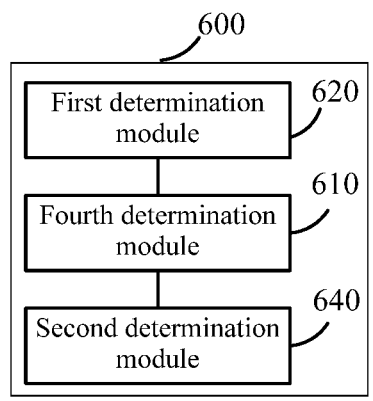

In addition, as shown in FIG. 6(g), the apparatus of this embodiment may further comprise:

A fourth determination module 610, configured to determine a transmission mode of data transmission performed by the first device and the second device at least according to the transmission capability of the first device, the transmission mode comprising information associated with using at least two MIMO channels for the data transmission performed by the first device and the second device.

The transmission mode may comprise various transmission modes that have been defined by existing wireless networks, and by taking LTE-A as an example, nine transmission modes are specified. In one possible implementation, the information associated with using at least two MIMO channels for the data transmission performed by the first device and the second device may serve as additional parameters in the various existing transmission modes in any suitable manner. In another possible implementation, a new transmission mode can be defined, and the transmission mode itself is: using at least two MIMO channels for data transmission. Correspondingly, the transmission modes that can be supported by the first device comprised in the transmission capability of the first device may further comprise the new transmission mode, that is, the first device supports capability of using at least two MIMO channels for data transmission.

The second determination module 640 can determine at least two MIMO channels available after the fourth determination module 610 determines that the at least two MIMO channels can be used between the first device and the second device for data transmission.

Figure 6H:
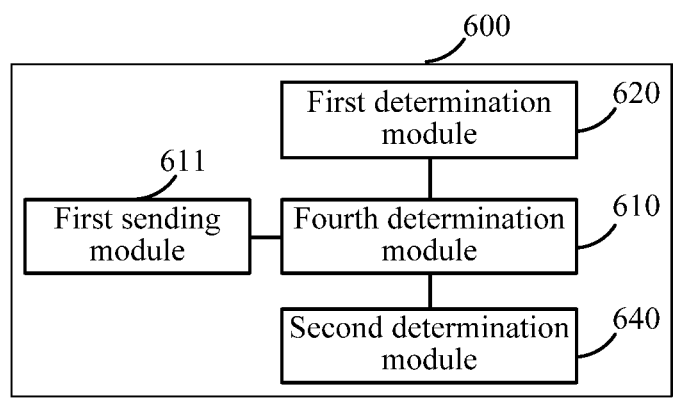

When the apparatus of this embodiment is a third-party device independent of the first device and/or the second device, as shown in FIG. 6(h), the apparatus 600 of this embodiment further comprises:

A first sending module 611, configured to send the transmission mode; specifically, the transmission mode is sent in a manner in which it can be received by the first device and/or the second device.

Figure 6I:
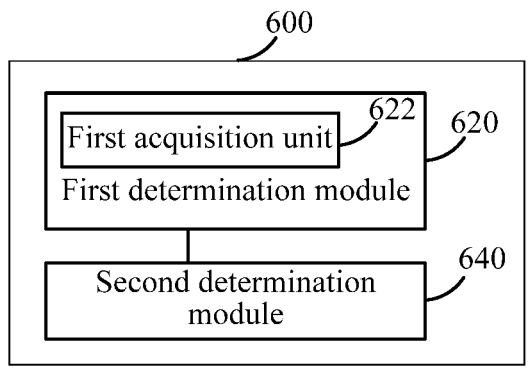

When the apparatus of this embodiment belongs to or is the second device, or a third-party device independent of the first device and the second device, or the first device and the second device are both AT devices, as shown in FIG. 6(i), the first determination module 620 further comprises:

A first acquisition unit 622, configured to acquire information associated with the transmission capability of the first device. For example, (when the body performing the method of this embodiment is a third-party device independent of the first device and the second device), the information is acquired from the first device, or from the second device, or from (when the first device and the second device are both AT devices) another device (for example, an AP device that the first device has accessed). The first determination module 620 determines the transmission capability of the first device according to the information.

If the apparatus of this embodiment is the first device or belongs to the first device, the first determination module 620 can directly determine the transmission capability of the first device.

Figure 6J:
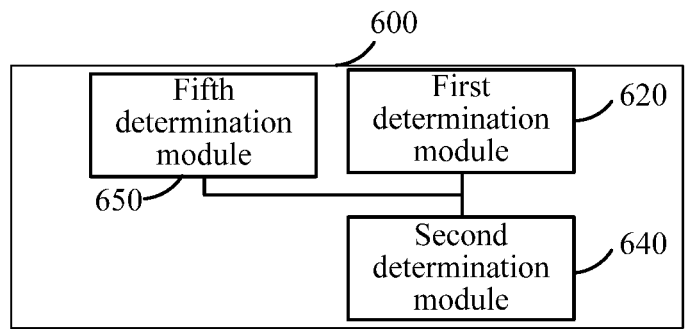

Moreover, if the apparatus of this embodiment belongs to or is the first device or is another device independent of the first device and the second device, as shown in FIG. 6(j), the apparatus 600 of this embodiment further comprises:

A fifth determination module 650, configured to determine transmission capability of the second device.

Figure 6K:
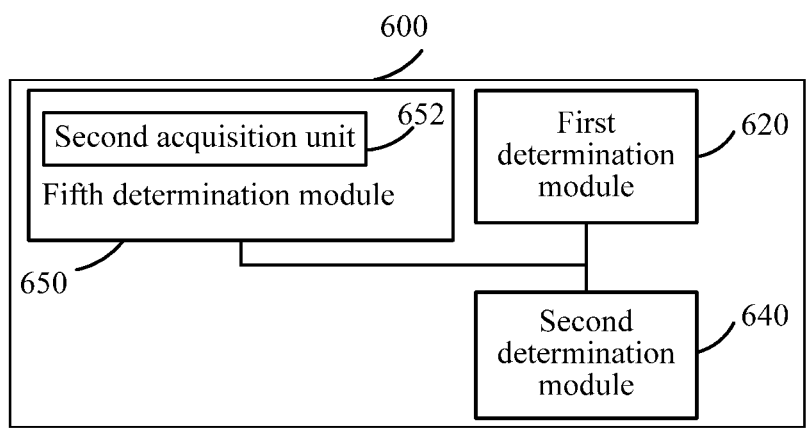
Figure 6L:
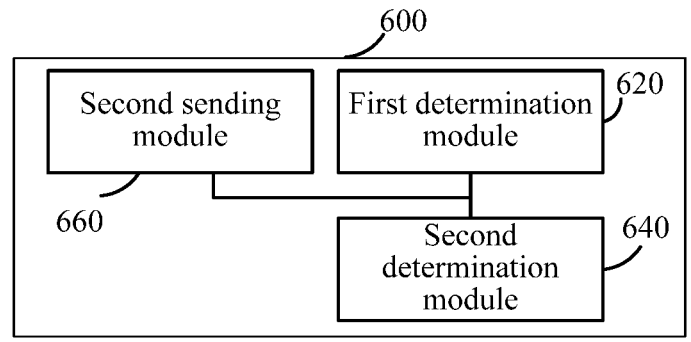

The fifth determination module 650 can, by acquiring information associated with the transmission capability of the second device directly from the second device or another device associated with the second device, determine the transmission capability of the second device. For example, when the second device is also an AT device, the information can be acquired through an AP device that the second device has accessed. Alternatively, if the second device is an AP device, the transmission capability thereof can be acquired from the second device when the first device and the second device establish a connection. That is, as shown in FIG. 6(k), the fifth determination module 650 may comprise:

A second acquisition unit 652, configured to acquire information associated with the transmission capability of the second device.

In such an implementation, the second determination module 640 can determine the transmission configuration at least according to the transmission capability of the first device and the transmission capability of the second device. Alternatively, the transmission configuration is determined at least according to the transmission capability of the first device and the transmission capability of the second device as well as (as stated above) data transmission demands and/or channel state information between the first device and the second device.

When the apparatus of this embodiment is a third-party device independent of the first device and/or the second device, as shown in FIG. 6(*l*), the apparatus 600 of this embodiment further comprises:

A second sending module 660, configured to send the transmission configuration. Specifically, the transmission configuration is sent in a manner in which it can be received by the first device and/or the second device. By taking a LTE system as an example, information of the transmission configuration can be sent by being placed in a message or control instruction related to RRC from an upper layer, for example, sent by being placed in a RRC reconfiguration message.

The first sending module 611 and the second sending module 660 may be the same module having a sending function.

To sum up, the apparatus of this embodiment supports that at least two separate MIMO channels coexist between an AT device and an AP device as well as between two AT devices, and can flexibly configure the at least two MIMO channels according to data transmission demands and the like, thus having higher data transmission efficiency.

Now referring to FIG. 7(*a*), FIG. 7(*a*) is a structural block diagram of an exemplary transmission control apparatus according to a second embodiment of the present application. The apparatus may belong to or be a first device, or belong to or be a second device, or be a third-party device independent of the first device and the second device. According to requirements of different roles of the apparatus, in addition to components described below, the apparatus may further comprise a communication module that achieves communication between any external devices outside the apparatus depending on particular requirements. As shown in FIG. 7(*a*), the apparatus 700 comprises:

A sixth determination module 720, configured to determine transmission capability of a first device.

In the apparatus of this embodiment, the transmission capability of the first device may comprise antenna configuration of the first device and transmission modes that can be supported by the first device. The antenna configuration of the first device may comprise the number of antennas that the first device has or can use, and how many receiving antennas, how many transmitting antennas there may be and so on. The transmission modes refer to data transmission manners, for example, spatial diversity, Beamforming and the like, transmission modes specified for different networks may be different, and by taking LTE-A as an example, nine transmission modes are specified.

A seventh determination module 740, configured to determine a transmission mode of data transmission performed by the first device and a second device at least according to the transmission capability of the first device, the transmission mode comprising information associated with using at least two MIMO channels for the data transmission performed by the first device and the second device. That is, it is determined that the first device and the second device can use at least two MIMO channels for data transmission.

To sum up, the apparatus of this embodiment supports that at least two separate MIMO channels coexist during data transmission between the first device and the second device.

In one possible implementation, the transmission mode may comprise various transmission modes that have been defined by existing wireless networks, and the information associated with using at least two MIMO channels for the data transmission performed by the first device and the second device may serve as additional parameters in the various existing transmission modes in any suitable manner. In another possible implementation, a new transmission mode can be defined, and the transmission mode itself is: using at least two MIMO channels for data transmission. Correspondingly, the transmission modes that can be supported by the first device comprised in the transmission capability of the first device may further comprise the new transmission mode, that is, the first device supports capability of using at least two MIMO channels for data transmission.

When the apparatus of this embodiment is a third-party device independent of the first device and/or the second device, as shown in FIG. 7(*b*), the apparatus 700 of this embodiment further comprises:

A third sending module 710, configured to send the transmission mode; specifically, the transmission mode is sent in a manner that it can be received by the first device and/or the second device.

In addition, as shown in FIG. 7(*c*), the apparatus 700 of this embodiment may further comprise:

An eighth determination module 760, configured to, after the seventh determination module 740 can determine a transmission mode for data transmission between the first device and the second device, determine transmission configuration between the first device and the second device at least according to the transmission capability of the first device, the transmission configuration comprising information associated with at least two MIMO channels available for data transmission between the first device and the second device.

According to the role of the body performing the method of this embodiment, the determination can be used to establish the at least two MIMO channels between the first device and the second device, and can also be used to establish a new MIMO channel and/or modify a MIMO channel currently used during the data transmission between the first device and the second device.

In one possible implementation, it is possible that at least one part of antennas, which belong to the first device, in the antennas forming the at least two MIMO channels are the same, that is, part or all of antennas of the first device comprised in at least two of the at least two MIMO channels may be the same. In such an implementation, such at least two MIMO channels may occupy different time resources, for example, in a TDD LTE system employing the method of this embodiment, a terminal has four antennas, two MIMO channels exist between an eNode B and a terminal device, the two MIMO channels comprise all the four antennas of the terminal, one MIMO channel is configured to receive downlink signals, and the other one is configured to send uplink signals; in order to achieve better transmission efficiency, the two MIMO channels can be defined to use different transmission modes, for example, one performs transmission in a manner of spatial diversity, and the other performs transmission in a manner of Beamforming; or the two MIMO channels can send different data streams at different times. The at least two MIMO channels coexisting may be determined before the first device and the second device begin to perform data transmission, so as to save the time on waiting during the process of data transmission and performing MIMO channel reconfiguration according to CQIs reported by the first device, and, although the same antenna may be included in different MIMO channels, for a corresponding upper layer, each MIMO channel is an independent channel, and the upper layer can configure the MIMO channel, such as allocating an encoding matrix thereto flexibly.

In another possible implementation, all the antennas of the first device comprised in at least two of the at least two MIMO channels may be different, that is, each of such at least two MIMO channels only comprises part of the antennas of the first device, which greatly reduces computational complexity of the AT and reduces device power consumption. This is because: for the MIMO system as shown in FIG. 1, for example, in a closed-loop spatial multiplexing transmission mode, a user terminal needs to feed back a Rank Indicator (RI), a PMI, and a CQI to a base station. The base station, according to the feedback of the user terminal and some other reference factors, for example, data to be transmitted, allocates a corresponding transmission mode to the user terminal. For a $N_T \times N_R$ MIMO channel, the terminal needs to estimate a $N_R \times N_R$ channel matrix while calculating the RI, and after the matrix is transformed, a rank of the matrix is the value of the RI. The computational complexity of the whole process is the square of $N_R$. Similarly, multiple codebooks with a maximum index of $N_R \times N_R$ may be designed in a LTE standard, and the RI selects an optimal codeword therefrom according to channel conditions and the like, and reports the corresponding index to the base station. The computational complexity of this process is also the square of $N_R$. In such an implementation of this embodiment, each MIMO channel only comprises part of the antennas, and the computational complexity is relatively lower.

It should be noted that, the eighth determination module 760 can determine antennas comprised in each MIMO channel according to any suitable technology, for any side device (the first device and the second device), for example, the antennas comprised in each MIMO channel should be determined on the premise of reducing correlation between the antennas as much as possible, and antennas having a certain spatial distance may be selected, which is a mature prior art and is not repeated herein.

To sum up, the apparatus of this embodiment supports that at least two separate MIMO channels coexist between an AT device and an AP device as well as between two AT devices, which has flexible configuration while ensuring a higher data transmission rate, and computational complexity is not high for the devices, which can reduce power consumption of the devices.

In addition, the transmission configuration may be determined by the eighth determination module 760 before the first device and the second device perform data transmission, and may also be determined during the data transmission between the first device and the second device, comprising: determining at least one MIMO channel before the first device and the second device perform data transmission, and establishing the at least one MIMO channel between the first device and the second device; during the data transmission, determining at least one other MIMO channel or re-determining at least two MIMO channels, and establishing the at least one other MIMO channel or re-determining the at least two MIMO channels, to cause that at least two MIMO channel coexist during the data between the first device and the second device. As shown in FIG. 7(d), in one possible implementation, the eighth determination module 760 comprises:

A sixth determination unit 762, configured to determine the transmission configuration at least according to the transmission capability of the first device and data transmission demands between the first device and the second device.

The data transmission demands may comprise at least one of the following: QoS requirements of data transmission, transmission rate requirements, user preference and so on. Such an implementation may be applied before the data transmission or applied during the data transmission. For example, the data transmission demands change during the data transmission, and in response to this, the system can determine the remaining at least one MIMO channel and/or reconfigures a current MIMO channel adaptively.

Figure 7A:
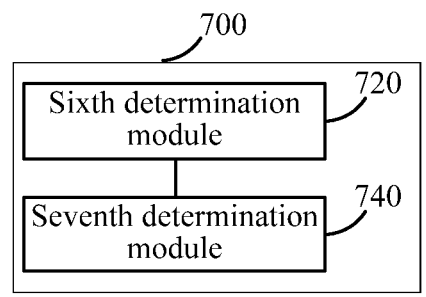
FIG. 7(a) to FIG. 7(l) are exemplary structural block diagrams of a transmission control apparatus according to a second embodiment of the present application.
Figure 7B:
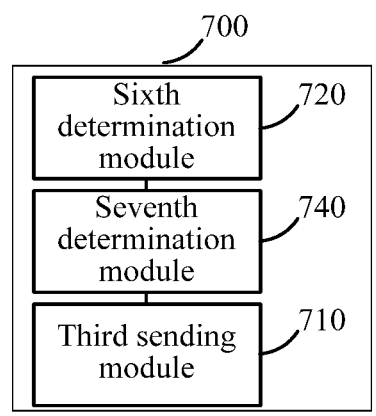
Figure 7C:
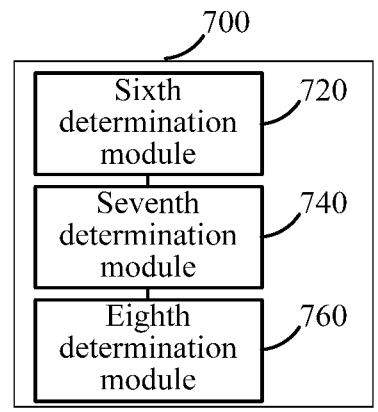
Figure 7D:
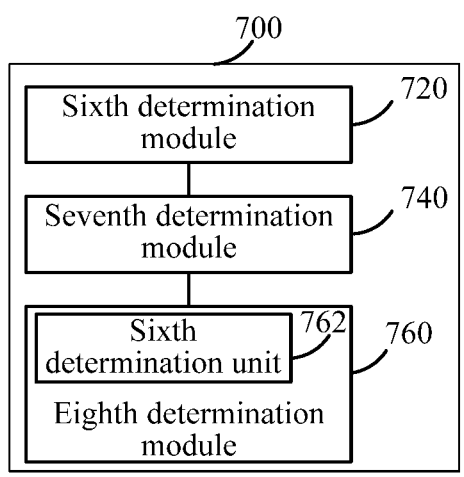
Figure 7E:
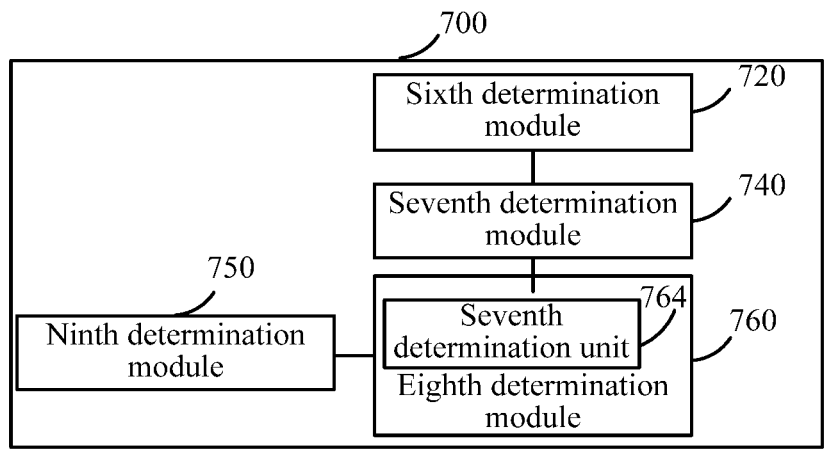

In another possible implementation, as shown in FIG. 7(e), the eighth determination module 760 may comprise:

A seventh determination unit 764, configured to determine the transmission configuration at least according to the transmission capability of the first device and channel state information between the first device and the second device.

That is, before the data transmission, in addition to the transmission capability of the first device, a channel state between the first device and the second device can be comprehensively considered, to determine suitable MIMO channels of which at least channel condition is suitable for transmitting data to be transmitted; during the data transmission, if a channel condition changes, it is possible that the current MIMO channel can no longer meet transmission demands of current data, and the transmission configuration is determined in response to this, to select suitable MIMO channels.

In such an implementation, the apparatus 700 of this embodiment further comprises:

A ninth determination module 750, configured to determine the channel state information between the first device and the second device.

Figure 7F:
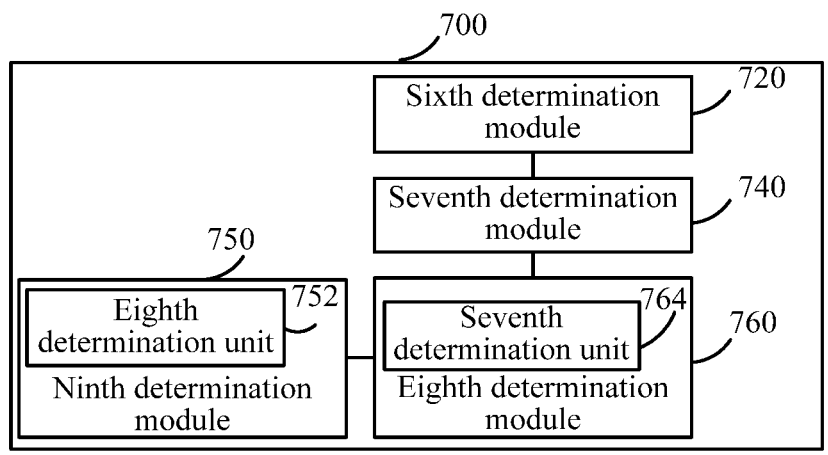

According to different transmission scenarios, there are different ways to determine the channel state information, by taking a LTE system as an example, when uplink scheduling is performed by the eNode B, the user terminal needs to transmit a sounding reference signal (SRS), to allow the eNode B to perform channel estimation. As shown in FIG. 7(f), in such an implementation, the ninth determination module 750 may comprise:

An eighth determination unit 752, configured to determine the channel state information at least according to a sounding reference signal (SRS) sent from the first device to the second device.

Figure 7G:
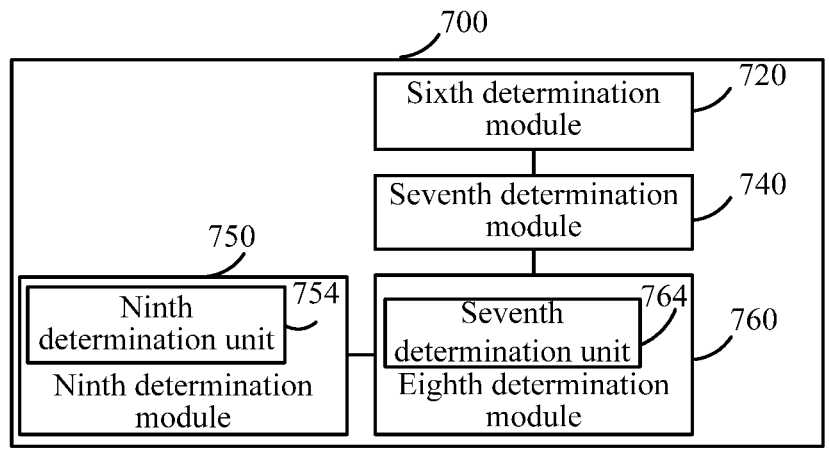
Figure 7H:
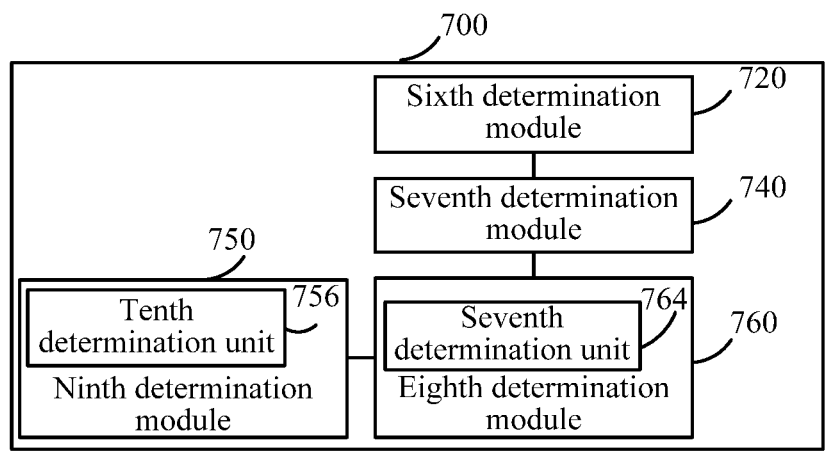
Figure 7I:
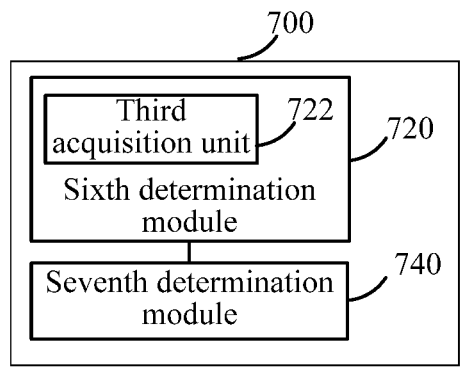
Figure 7J:
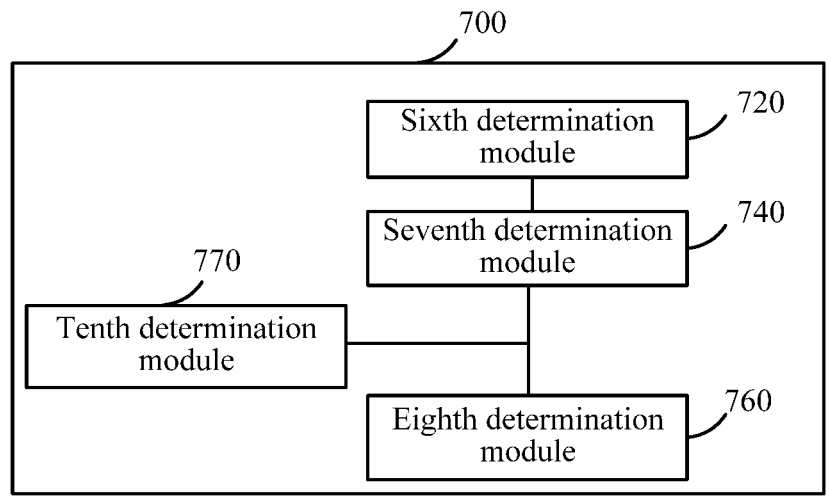
Figure 7K:
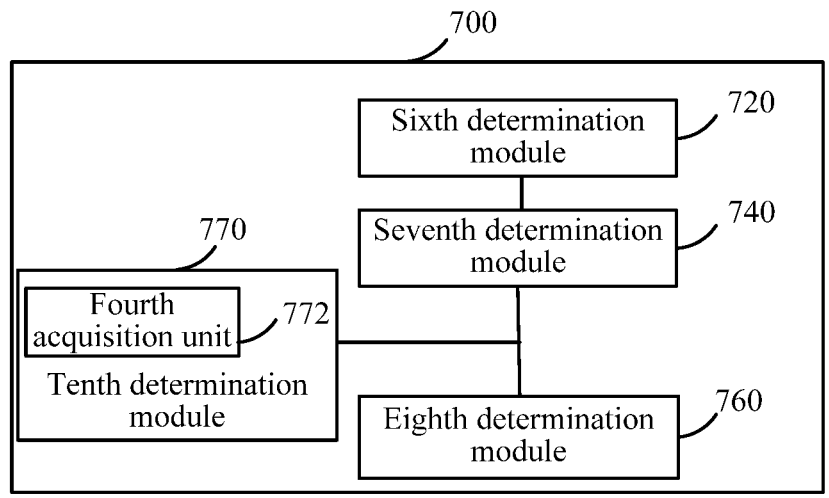
Figure 7L:
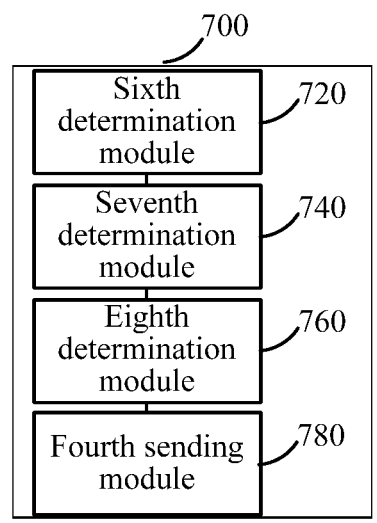

When the eNode B performs downlink scheduling, the user terminal may feedback CQIs, Rank Indicators (PMIs are further comprised in the case of closed-loop spatial diversity) and other information, to support the eNode B to perform adaptive code modulation, precoding, channel estimation and so on, and in such an implementation, as shown in FIG. 7(g), in such an implementation, the ninth determination module 750 may comprise:

A ninth determination unit 754, configured to determine the channel state information between the first device and the second device at least according to CQIs and/or Rank Indicators of at least part of all possible wireless channels between the first device and the second device sent from the first device to the second device. The all possible wireless channels refer to channels that can be formed between each transmitting antenna and each receiving antenna, comprising allocated wireless channels configured to perform data transmission between the first device and the second device, wireless channels allocated to other devices and idle wireless channels. Channel state information of all wireless channels can be determined according to CQIs and/or Rank Indicators and other information of at least part of all the wireless channels, and suitable MIMO channels are determined. In one possible implementation, the at least part of all possible wireless channels comprises wireless channels not used for data transmission currently.

In the implementation where one or more MIMO channels between the first device and the second device have been determined, as shown in FIG. 7(*h*), the ninth determination module 750 may comprise:

A tenth determination unit 756, configured to determine the channel state information associated with at least one MIMO channel at least according to Channel Quality Indicators (CQIs) and/or Rank Indicators associated with the at least one MIMO channel sent from the first device to the second device. The at least one MIMO channel is a MIMO channel that has been used for data transmission between the first device and the second device, and according to channel state information of the MIMO channel that has been used, it can be determined whether the MIMO channel is still qualified for transmission demands of data currently transmitted and whether it is necessary to establish at least one other MIMO channels, such as adding MIMO channels and reconfiguring existing MIMO channels.

In the implementation where the first device is an AT device and the second device is an AP device, antenna allocation of the AT device is a mature prior art and is not a limitation to the technical solution of this embodiment; in the method of this embodiment, in order to support multiple MIMO channels between the first device and the second device, multiple antennas of the first device have capability of grouping or have been divided into multiple antenna groups, each of which comprises at least one antenna. Therefore, the eighth determination module 760 is mainly configured to determine antenna groups of the first device comprised in each of the at least two MIMO channels available for data transmission between the first device and the second device at least according to the transmission capability of the first device. That is, the antenna configuration of the first device determined by the sixth determination module 720 further comprises the number of antennas that the first device has and the first device's capability of dividing the antennas into at least two antenna groups, and the body performing the method of this embodiment, the eighth determination module 760, determines which antennas each of the at least two MIMO channels comprises. Alternatively, the antenna configuration of the first device determined by the sixth determination module 720 may directly comprise a grouping situation where the antennas are divided into at least two antenna groups, that is, the grouping situation of the first device is known, and the eighth determination module 760 determines which antenna groups each of the MIMO channels determined comprises.

When the apparatus of this embodiment is the second device, or a third-party device independent of the first device and the second device, or the first device and the second device are both AT devices, as shown in FIG. 7(*i*), the sixth determination module 720 further comprises:

A third acquisition unit 722, configured to acquire information associated with the transmission capability of the first device. For example, (when the body performing the method of this embodiment is a third-party device independent of the first device and the second device), the information is acquired from the first device, or acquired from the second device, or acquired from (when the first device and the second device are both AT devices) another device (for example, an AP device that the first device has accessed).

The sixth determination module 720 determines the transmission capability of the first device according to such information.

If the apparatus of this embodiment is the first device or belongs to the first device, the sixth determination module 720 can directly determine the transmission capability of the first device.

Moreover, if the apparatus of this embodiment is the first device or is another device independent of the first device and the second device, as shown in FIG. 7(*j*), the apparatus 700 of this embodiment further comprises:

A tenth determination module 770, configured to determine transmission capability of the second device.

The transmission capability of the second device can be determined by acquiring information associated with the transmission capability of the second device directly from the second device or another device associated with the second device. For example, when the second device is also an AT device, the information can be acquired through an AP device that the second device has accessed. Alternatively, if the second device is an AP device, the transmission capability thereof can be acquired from the second device when the first device and the second device establish a connection. That is, as shown in FIG. 7(*k*), the tenth determination module 770 may comprise:

A fourth acquisition unit 772, configured to acquire information associated with the transmission capability of the second device.

In such an implementation, the eighth determination module 760 can determine the transmission configuration at least according to the transmission capability of the first device and the transmission capability of the second device. Alternatively, the transmission configuration is determined at least according to the transmission capability of the first device and the transmission capability of the second device as well as (as stated above) data transmission demands and/or channel state information between the first device and the second device.

When the apparatus of this embodiment is a third-party device independent of the first device and/or the second device, as shown in FIG. 7(*l*), the apparatus 700 of this embodiment further comprises:

A fourth sending module 780, configured to send the transmission configuration. Specifically, the transmission configuration is sent in a manner in which it can be received by the first device and/or the second device. By taking a LTE system as an example, information of the transmission configuration can be sent by being placed in a message or control instruction related to RRC from an upper layer, for example, sent by being placed in a RRC reconfiguration message.

The third sending module 710 and the fourth sending module 780 may be the same module having a sending function.

To sum up, the apparatus of this embodiment supports that at least two separate MIMO channels coexist between an AT device and an AP device as well as between two AT devices, and can flexibly configure the at least two MIMO channels according to data transmission demands and the like, thus having higher data transmission efficiency.

FIG. 8(*a*) is a structural block diagram of an exemplary transmission control apparatus 800 according to a second embodiment of the present application. The apparatus may belong to or be a first device. As shown in FIG. 8(*a*), the apparatus 800 comprises:

A fifth sending module 820, configured to send transmission capability of a first device.

In a method of this embodiment, the transmission capability of the first device may comprise antenna configuration of the first device and transmission modes that can be supported by the first device. The antenna configuration of the first device may comprise the number of antennas that the first device has or can use, and how many receiving antennas, how many transmitting antennas there may be and so on. The transmission modes refer to data transmission manners, for example, spatial diversity, Beamforming and the like, transmission modes specified for different networks may be different, and by taking LTE-A as an example, nine transmission modes are specified.

A first receiving module 840, configured to receive transmission configuration between the first device and a second device, the transmission configuration being at least related to the transmission capability of the first device, and comprising information associated with at least two MIMO channels available for data transmission between the first device and the second device.

The apparatus of this embodiment supports that at least two separate MIMO channels coexist in a process that the first device and the second device perform data transmission.

With reference to the description in the apparatus of the first embodiment, in one possible implementation, in the transmission configuration, it is possible that at least one part of antennas, which belong to the first device, in the antennas consisting of the at least two MIMO channels are the same, that is, part of or all of antennas of the first device comprised in at least two of the at least two MIMO channels may be the same. In such an implementation, such at least two MIMO channels may occupy different time resources and use different transmission modes; alternatively, the two MIMO channels can send different data streams at different times. In another possible implementation, all the antennas of the first device comprised in at least two of the at least two MIMO channels may be different, that is, each of such at least two MIMO channels only comprises part of the antennas of the first device, which greatly reduces computational complexity of the AT and reduces device power consumption.

To sum up, the apparatus of this embodiment supports that at least two separate MIMO channels coexist between an AT device and an AP device as well as between two AT devices, which has flexible configuration while ensuring a higher data transmission rate, and computational complexity is not high for the devices, which can reduce power consumption of the devices.

Still with reference to the description in the apparatus of the first embodiment, the transmission configuration may be determined before the first device and the second device perform data transmission, and may also be determined during the data transmission between the first device and the second device, comprising: determining at least one MIMO channel before the first device and the second device perform data transmission, and establishing the at least one MIMO channel between the first device and the second device; during the data transmission, determining at least one other MIMO channel or re-determining at least two MIMO channels. In one possible implementation, the transmission configuration is determined at least according to the transmission capability of the first device and data transmission demands between the first device and the second device. The data transmission demands may comprise at least one of the following: QoS requirements of data transmission, transmission rate requirements, user preference and so on. For example, the transmission configuration is determined like this: the data transmission demands change during the data transmission, and in response to this, the system can determine the remaining at least one MIMO channel and/or reconfigures a current MIMO channel adaptively.

In another possible implementation, the transmission configuration is at least related to the transmission capability of the first device and channel state information between the first device and the second device, for example, the transmission configuration is determined at least according to the transmission capability of the first device and channel state information between the first device and the second device. Specifically, the transmission configuration may be determined before the data transmission, in addition to the transmission capability of the first device, determination of the transmission configuration comprehensively considers a channel state between the first device and the second device, and the determined MIMO channels are channels of which at least channel condition is suitable; the transmission configuration may also be determined in response to a change in a channel condition during data transmission, and the change in the channel condition may be, for example, that the current MIMO channel can no longer meet transmission demands of current data.

According to different transmission scenarios, in order to provide reference for determining the channel state information, a LTE system is taken as an example, when uplink scheduling is performed by the eNode B, the user terminal needs to transmit a SRS, to allow the eNode B to perform channel estimation, and in such an implementation, as shown in FIG. 8(*b*), the apparatus 800 of this embodiment may comprise:

A sixth sending module 830, configured to send a SRS to the second device.

In another implementation, the LTE system is still taken as an example, when the eNode B performs downlink scheduling, the user terminal may feed back CQIs, Rank Indicators (PMIs are further comprised in the case of closed-loop spatial diversity) and other information, to support the eNode B to perform adaptive code modulation, precoding, channel estimation and so on, and in such an implementation, as shown in FIG. 8(*c*), the apparatus 800 of this embodiment may comprise:

A seventh sending module 830', configured to send to the second device Channel Quality Indicators (CQIs) and/or Rank Indicators of at least part of all possible wireless channels between the first device and the second device.

The all possible wireless channels comprise allocated wireless channels configured to perform data transmission between the first device and the second device, wireless channels allocated to other devices and idle wireless channels. Channel state information of all wireless channels can be determined according to CQIs, Rank Indicators and other information of all the wireless channels, and suitable MIMO channels are determined.

Alternatively,

As shown in FIG. 8(*d*), the apparatus 800 of this embodiment may comprise:

An eighth sending module 830", configured to send to the second device Channel Quality Indicators (CQIs) and/or Rank Indicators associated with the at least one MIMO channel.

The at least one MIMO channel is a MIMO channel that has been used for data transmission between the first device and the second device, and according to channel state information of the MIMO channel that has been used, it can be determined whether the MIMO channel is still qualified for transmission demands of data currently transmitted and whether it is necessary to establish at least one other MIMO channels, comprising adding MIMO channels and reconfiguring existing MIMO channels.

It should be noted that, the modules (the second, third, fourth and fifth sending modules) having a sending function may be the same module.

In the implementation where the first device is an AT device and the second device is an AP device, in order to support multiple MIMO channels between the first device and the second device, multiple antennas of the first device have capability of grouping or have been divided into multiple antenna groups, each of which comprises at least one antenna. In the apparatus of this embodiment, the antenna configuration comprises the number of antennas that the first device has and the first device's capability of dividing the antennas into at least two antenna groups, and the transmission configuration comprises which antennas each of the at least two MIMO channels comprises; or the antenna configuration comprises the number of antennas that the first device has and the first device's capability of dividing the antennas into at least two antenna groups, and the transmission configuration comprises which antenna group each MIMO channel determined comprises.

Figure 8A:
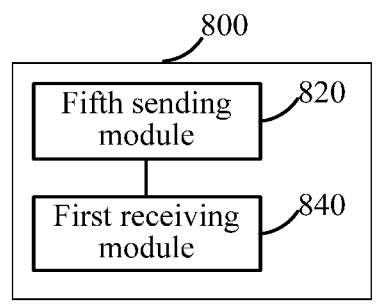
Figure 8B:
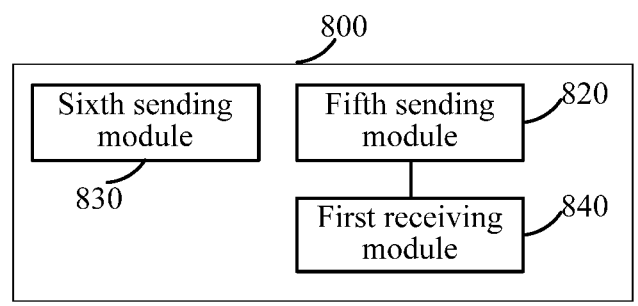
Figure 8C:
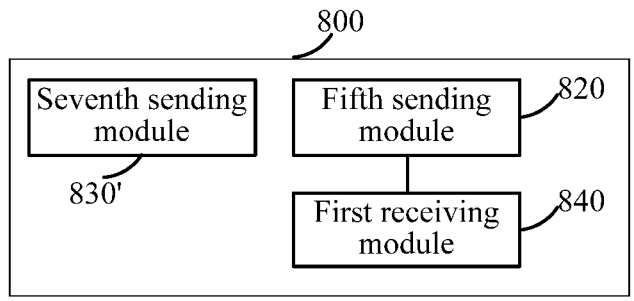
Figure 8D:
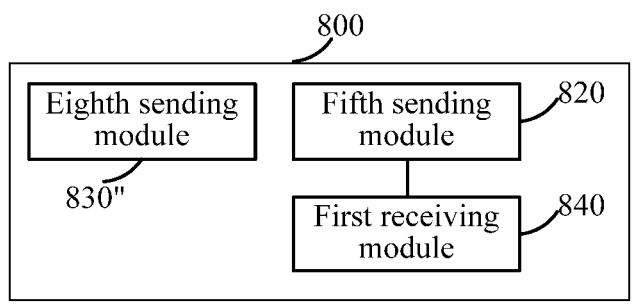
Figure 8E:
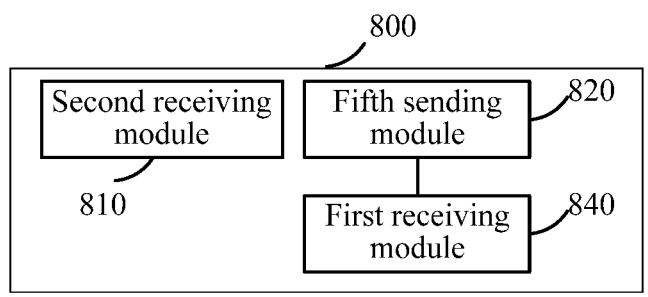

In addition, as shown in FIG. 8(e), the apparatus 800 of this embodiment further comprises:

A second receiving module 810, configured to receive a transmission mode of data transmission performed by the first device and the second device, the transmission mode being at least related to the transmission capability of the first device, and the transmission mode comprising information associated with using at least two MIMO channels for the data transmission performed by the first device and the second device.

The transmission mode may comprise various transmission modes that have been defined by existing wireless networks, and by taking LTE-A as an example, nine transmission modes are specified. In one possible implementation, the information associated with using at least two MIMO channels for the data transmission performed by the first device and the second device may serve as additional parameters in the various existing transmission modes in any suitable manner. In another possible implementation, a new transmission mode can be defined, and the transmission mode itself is: using at least two MIMO channels for data transmission. Correspondingly, the transmission modes that can be supported by the first device comprised in the transmission capability of the first device may further comprise the new transmission mode, that is, the first device supports capability of using at least two MIMO channels for data transmission.

Figure 8F:
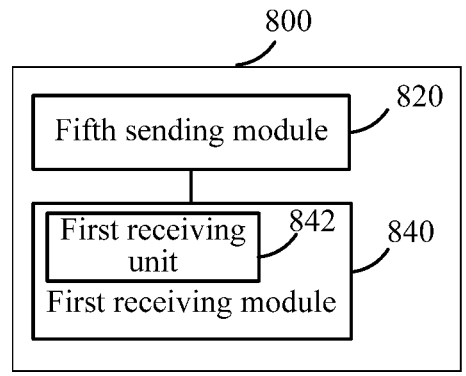

Moreover, as described in the apparatus of the first embodiment, the transmission configuration may be sent by being placed in a RRC reconfiguration message, and correspondingly, as shown in FIG. 8(f), the first receiving module 840 may comprise:

A first receiving unit 842, configured to receive a RRC reconfiguration message, the RRC reconfiguration message comprising the transmission configuration.

To sum up, the apparatus of this embodiment can assist in achieving that at least two separate MIMO channels coexist between an AT device and an AP device as well as between two AT devices.

Figure 9A:
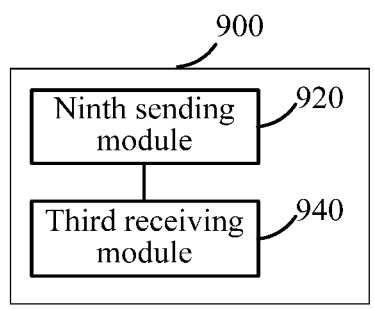

FIG. 9(a) is a structural block diagram of an exemplary transmission control apparatus 900 according to a fourth embodiment of the present application. The apparatus may be a first device or belong to the first device. As shown in FIG. 9(a), the apparatus 900 comprises:

A ninth sending module 920, configured to send transmission capability of a first device.

In a method of this embodiment, the transmission capability of the first device may comprise antenna configuration of the first device and transmission modes that can be supported by the first device. The antenna configuration of the first device may comprise the number of antennas that the first device has or can use, and how many receiving antennas, how many transmitting antennas there may be and so on. The transmission modes refer to data transmission manners, for example, spatial diversity, Beamforming and the like, transmission modes specified for different networks are different, and by taking LTE-A as an example, nine transmission modes are specified.

A third receiving module 940, configured to receive a transmission mode of data transmission performed by the first device and a second device, the transmission mode being at least related to the transmission capability of the first device, and the transmission mode comprising information associated with using at least two MIMO channels for the data transmission performed by the first device and the second device. The transmission configuration being at least related to the transmission capability of the first device comprises: the transmission configuration is determined at least according to the transmission capability of the first device.

To sum up, the apparatus of this embodiment supports that at least two separate MIMO channels coexist during the data transmission between the first device and the second device.

In one possible implementation, the transmission mode may comprise various transmission modes that have been defined by existing wireless networks, and the information associated with using at least two MIMO channels for the data transmission performed by the first device and the second device may serve as additional parameters in the various existing transmission modes in any suitable manner. In another possible implementation, a new transmission mode can be defined, and the transmission mode itself is: using at least two MIMO channels for data transmission. Correspondingly, the transmission modes that can be supported by the first device comprised in the transmission capability of the first device may further comprise the new transmission mode, that is, the first device supports capability of using at least two MIMO channels for data transmission.

Figure 9B:
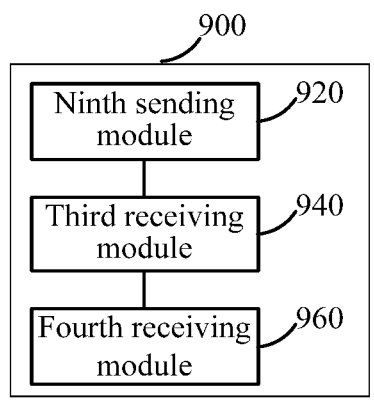

In addition, as shown in FIG. 9(b), the apparatus 900 of this embodiment further comprises:

A fourth receiving module 960, configured to receive transmission configuration between the first device and the second device, the transmission configuration between the first device and the second device being at least related to the transmission capability of the first device, and the transmission configuration comprising information associated with at least two MIMO channels available for data transmission between the first device and the second device.

With reference to the description in the apparatus of the third embodiment, the transmission configuration being at least related to the transmission capability of the first device comprises: the transmission configuration is determined at least according to the transmission capability of the first device. The determination can be used to establish the at least two MIMO channels between the first device and the second device, and can also be used to establish a new MIMO channel and/or modify a MIMO channel currently used in a process of performing data transmission between the first device and the second device.

Still with reference to the description in the apparatus of the third embodiment, in one possible implementation, in the transmission configuration, it is possible that at least part of antennas, which belong to the first device, in the antennas forming the at least two MIMO channels are the same, that is, part of or all of the antennas of the first device comprised in at least two of the at least two MIMO channels may be the same. In such an implementation, such at least two MIMO channels may occupy different time resources and use different transmission modes; or the two MIMO channels may send different data streams at different times. The at least two MIMO channels coexisting may be determined before the first device and the second device begin to perform data transmission. In another possible implementation, all the antennas of the first device comprised in at least two of the at least two MIMO channels in the transmission configuration may be different, that is, each of such at least two MIMO channels only comprises part of the antennas of the first device, which greatly reduces computational complexity of the AT and reduces device power consumption.

To sum up, the apparatus of this embodiment supports that at least two separate MIMO channels coexist between an AT device and an AP device as well as between two AT devices, which has flexible configuration while ensuring a higher data transmission rate, and computational complexity is not high for the devices, which can reduce power consumption of the devices.

Still with reference to the description in the apparatus of the third embodiment, the transmission configuration may be determined before the first device and the second device perform data transmission, and may also be determined during the data transmission between the first device and the second device, comprising: determining at least one MIMO channel before the first device and the second device perform data transmission, and establishing the at least one MIMO channel between the first device and the second device; during the data transmission, determining at least one other MIMO channel or re-determining at least two MIMO channels, and establishing the at least one other MIMO channel or re-determining the at least two MIMO channels, to cause that at least two MIMO channel coexist during the data transmission between the first device and the second device. According to different factors such as time and effect of the determination, in one possible implementation, the transmission configuration is at least related to the transmission capability of the first device and data transmission between the first device and the second device, for example, the transmission configuration is determined at least according to the transmission capability of the first device and data transmission demands between the first device and the second device.

In another possible implementation, the transmission configuration is at least related to the transmission capability of the first device and channel state information between the first device and the second device, for example, the transmission configuration is determined at least according to the transmission capability of the first device and channel state information between the first device and the second device. Specifically, the transmission configuration may be determined before the data transmission, in addition to the transmission capability of the first device, determination of the transmission configuration comprehensively considers a channel state between the first device and the second device, and the determined MIMO channels are channels of which at least channel condition is suitable; the transmission configuration may also be determined in response to a change in a channel condition during data transmission, and the change in the channel condition may be, for example, that the current MIMO channel can no longer meet transmission demands of current data.

Figure 9C:
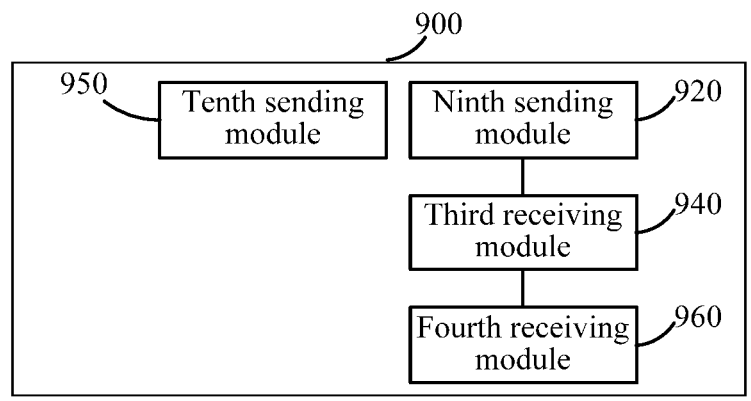

According to different transmission scenarios, in order to provide reference for determining the channel state information, a LTE system is taken as an example, when uplink scheduling is performed by the eNode B, the user terminal needs to transmit a SRS, to allow the eNode B to perform channel estimation, and in such an implementation, as shown in FIG. 9(c), the apparatus 900 of this embodiment may comprise:

A tenth sending module 950, configured to send a sounding reference signal (SRS) to the second device.

Figure 9D:
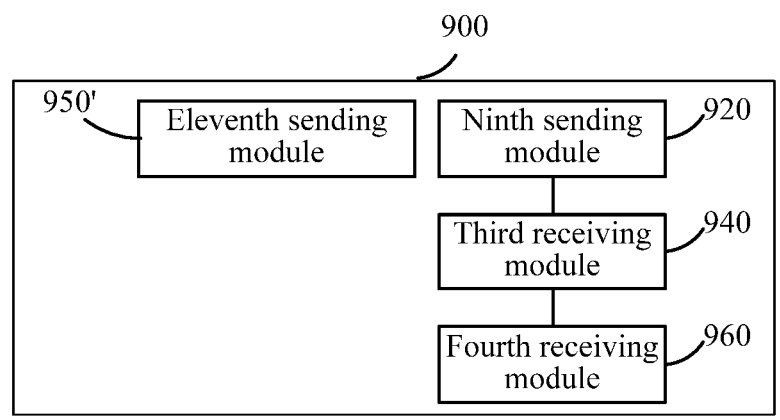

In another implementation, the LTE system is still taken as an example, when the eNode B performs downlink scheduling, the user terminal may feedback CQIs, Rank Indicators (PMIs are further comprised in the case of closed-loop spatial diversity) and other information, to support the eNode B to perform adaptive code modulation, precoding, channel estimation and so on, and in such an implementation, as shown in FIG. 9(d), the apparatus 900 of this embodiment may comprise:

An eleventh sending module 950', configured to send to the second device CQIs and/or Rank Indicators of at least part of all possible wireless channels between the first device and the second device, and determine the channel state information between the first device and the second device.

The all possible wireless channels refer to channels that can be formed between each transmitting antenna and each receiving antenna, comprising allocated wireless channels configured to perform data transmission between the first device and the second device, wireless channels allocated to other devices and idle wireless channels. Channel state information of all wireless channels can be determined according to CQIs, Rank Indicators and other information of all the wireless channels, and suitable MIMO channels are determined. The at least part of all possible channels comprises wireless channels not used by current data transmission. The transmission mode is at least related to the transmission capability of the first device.

Figure 9E:
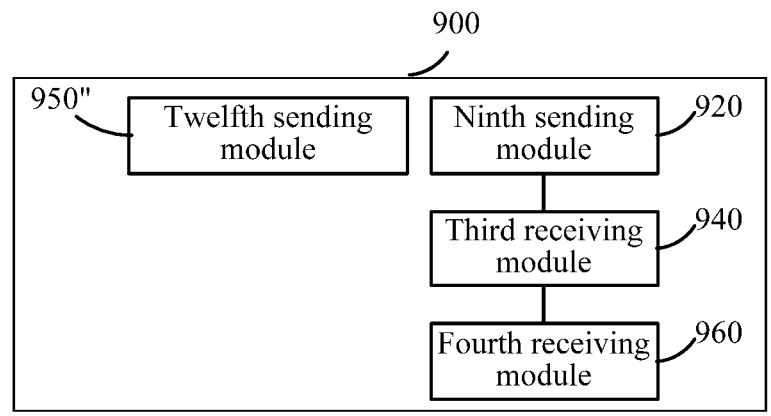

Alternatively, as shown in FIG. 9(e), the apparatus 900 of this embodiment may further comprise:

A twelfth sending module 950", configured to send to the second device CQIs and/or Rank Indicators associated with the at least one MIMO channel.

The at least one MIMO channel is a MIMO channel that has been used for data transmission between the first device and the second device, and according to channel state information of the MIMO channel that has been used, it can be determined whether the MIMO channel is still qualified for transmission demands of data currently transmitted and whether it is necessary to establish at least one other MIMO channels, comprising adding MIMO channels and reconfiguring existing MIMO channels.

In the implementation where the first device is an AT device and the second device is an AP device, in order to support multiple MIMO channels between the first device and the second device, multiple antennas of the first device have capability of grouping or have been divided into multiple antenna groups, each of which comprises at least one antenna. In the method of this embodiment, the antenna configuration comprises the number of antennas that the first device has and the first device's capability of dividing the antennas into at least two antenna groups, and the transmission configuration comprises which antennas each of the at least two MIMO channels comprises; or the antenna configuration comprises the number of antennas that the first device has and the first device's capability of dividing the antennas into at least two antenna groups, and the transmission configuration comprises which antenna group each MIMO channel determined comprises.

Figure 9F:
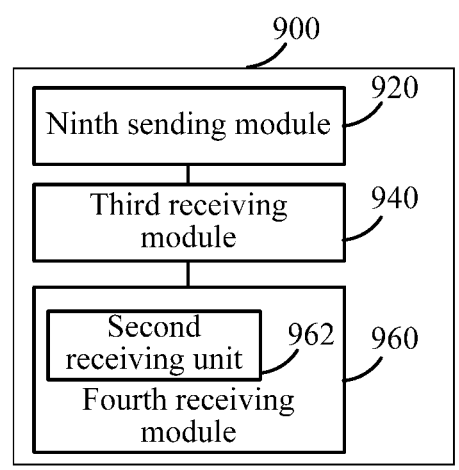

Moreover, as described in the apparatus of the third embodiment, the transmission configuration may be sent by being placed in a message or control instruction related to RRC from an upper layer, and correspondingly, as shown in FIG. 9(f), the fourth receiving module 960 of the apparatus of this embodiment may comprise:

A second receiving unit 962, configured to receive a message or control instruction related to RRC from an upper layer, the message or control instruction being a RRC reconfiguration message.

To sum up, the apparatus of this embodiment can assist in achieving that at least two separate MIMO channels coexist between an AT device and an AP device as well as between two AT devices.

Figure 10:
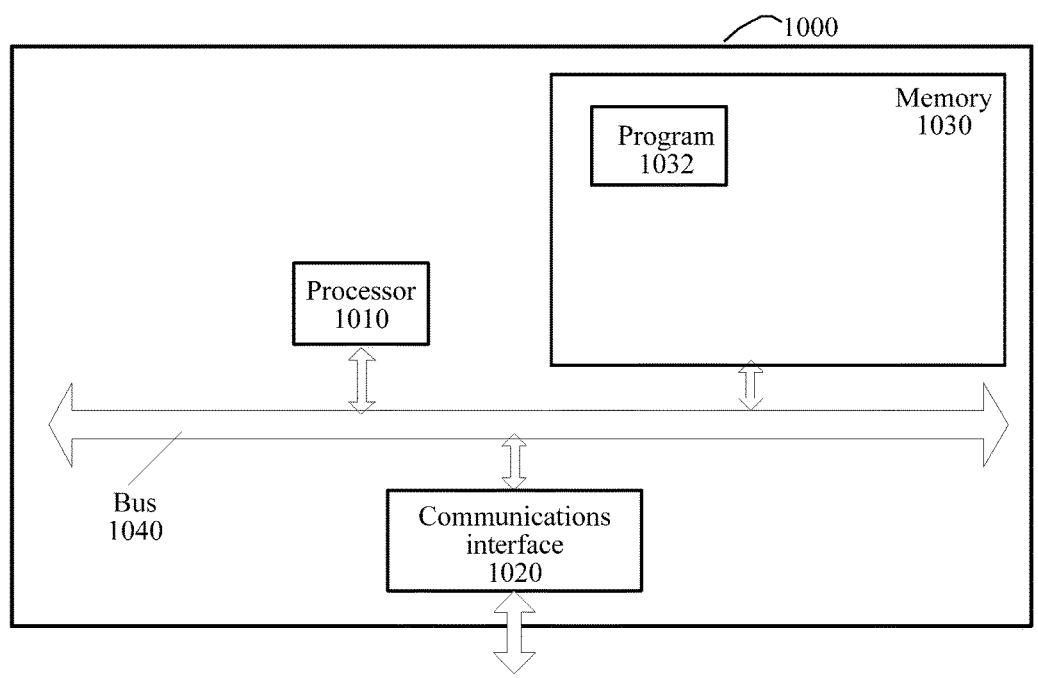
FIG. 10 is another schematic structural diagram of the transmission control apparatus according to the first embodiment of the present application.

FIG. 10 is a schematic structural diagram of a first transmission control apparatus 1000 according to an embodiment of the present application, and the specific embodment of the present application does not limit a specific implementation of the transmission control apparatus 1000. As shown in FIG. 10, the transmission control apparatus 1000 may comprise:

a processor 1010, a Communications Interface 1020, a memory 1030, and a communications bus 1040.

The processor 1010, the Communications Interface 1020, and the memory 1030 accomplish mutual communications via the communications bus 1040.

The Communications Interface 1020 is configured to communicate with a network element such as a client.

The processor 1010 is configured to execute a program 1032, and specifically, can implement relevant functions of the transmission control apparatus in the apparatus embodiment of FIG. 6(a).

Specifically, the program 1032 may comprise a program code, the program code comprising computer operation instructions.

The processor 1010 may be a central processing unit (CPU), or an application specific integrated circuit (ASIC), or be configured to be one or more integrated circuits which implement the embodiments of the present application. The program 1032 can be specifically configured to cause the transmission control apparatus 1000 to execute the following steps:

determining transmission capability of a first device; and
determining transmission configuration between the first device and a second device at least according to the transmission capability of the first device, the transmission configuration comprising information associated with at least two MIMO channels available for data transmission between the first device and the second device.

Reference can be made to corresponding description in the corresponding steps and units in the embodiments for specific implementation of the steps in the program 1032, which is not repeated herein. Those skilled in the art can clearly understand that, reference can be made to the corresponding process description in the method embodiments for the devices described above and the specific working procedures of the modules, and will not be repeated herein in order to make the description convenient and concise.

Figure 11:
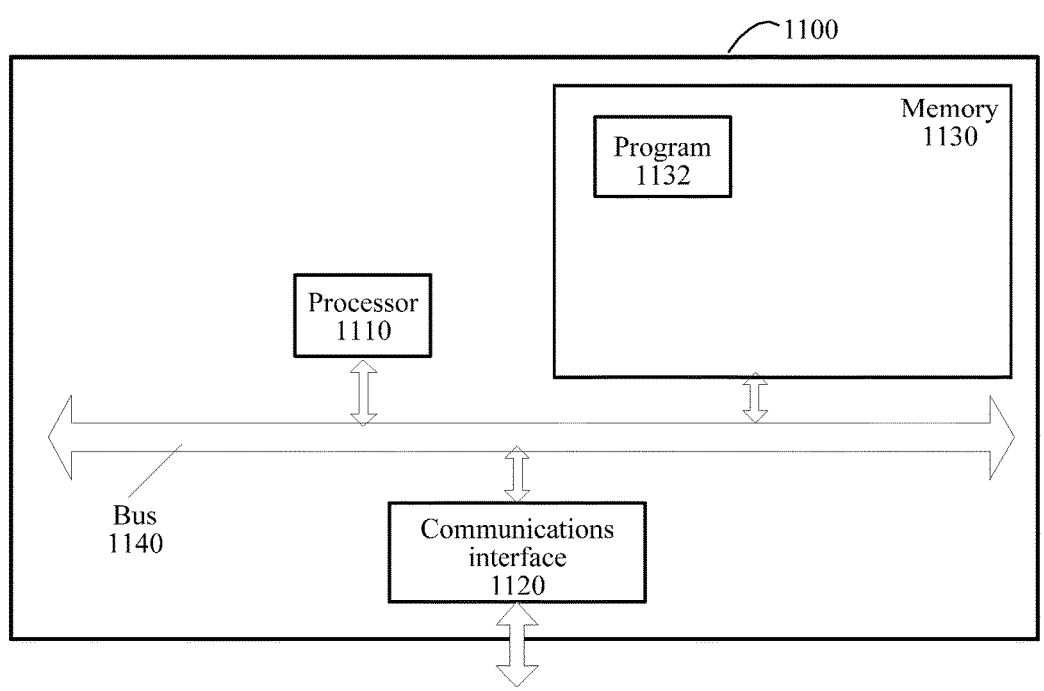
FIG. 11 is another schematic structural diagram of the transmission control apparatus according to the second embodiment of the present application.

FIG. 11 is a schematic structural diagram of a first transmission control apparatus 1100 according to an embodiment of the present application, and the specific embedment of the present application does not limit a specific implementation of the transmission control apparatus 1100. As shown in FIG. 11, the transmission control apparatus 1100 may comprise:

a processor 1110, a Communications Interface 1120, a memory 1130, and a communications bus 1140.

The processor 1110, the Communications Interface 1120, and the memory 1130 accomplish mutual communications via the communications bus 1140.

The Communications Interface 1120 is configured to communicate with a network element such as a client.

The processor 1110 is configured to execute a program 1132, and specifically, can implement relevant functions of the transmission control apparatus in the apparatus embodiment of FIG. 7(a).

Specifically, the program 1132 may comprise a program code, the program code comprising computer operation instructions.

The processor 1110 may be a CPU, or an ASIC, or be configured to be one or more integrated circuits which implement the embodiments of the present application. The program 1132 can be specifically configured to cause the transmission control apparatus 1100 to execute the following steps:

determining transmission capability of a first device; and
determining a transmission mode of data transmission performed by the first device and a second device at least according to the transmission capability of the first device, the transmission mode comprising information associated with using at least two MIMO channels for the data transmission performed by the first device and the second device.

Reference can be made to corresponding description in the corresponding steps and units in the embodiments for specific implementation of the steps in the program 1132, which is not repeated herein. Those skilled in the art can clearly understand that, reference can be made to the corresponding process description in the method embodiments for the devices described above and the specific working procedures of the modules, and will not be repeated herein in order to make the description convenient and concise.

Figure 12:
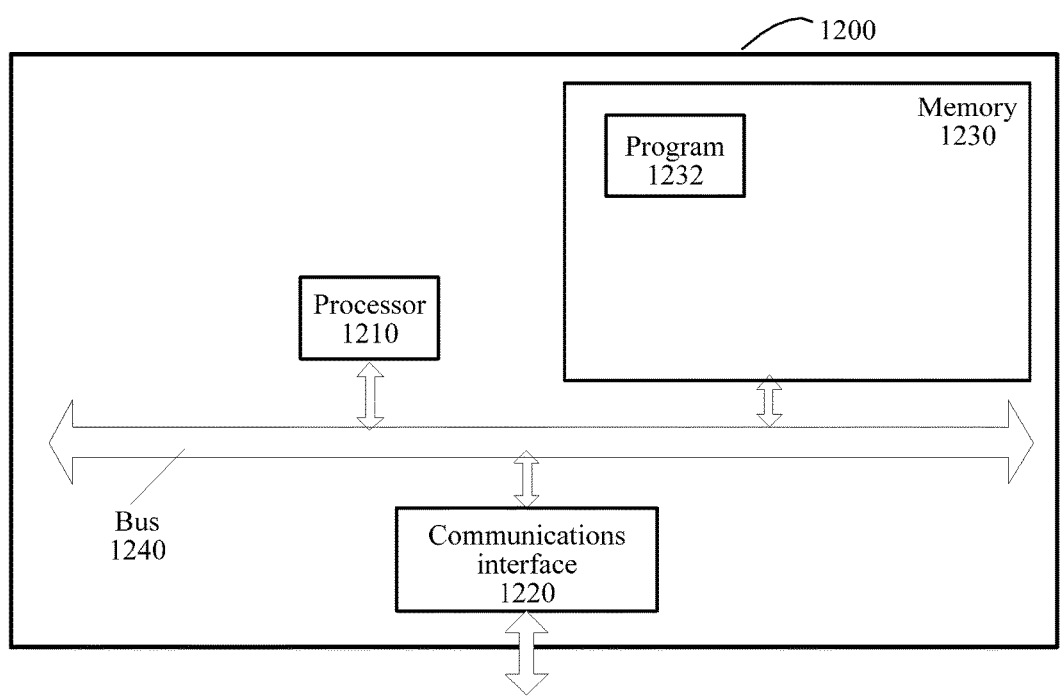
FIG. 12 is another schematic structural diagram of the transmission control apparatus according to the third embodiment of the present application.

FIG. 12 is a schematic structural diagram of a third transmission control apparatus 1200 according to an embodiment of the present application, and the specific embedment of the present application does not limit a specific implementation of the transmission control apparatus 1200. As shown in FIG. 12, the transmission control apparatus 1200 may comprise:

a processor 1210, a Communications Interface 1220, a memory 1230, and a communications bus 1240.

The processor 1210, the Communications Interface 1220, and the memory 1230 accomplish mutual communications via the communications bus 1240.

The Communications Interface 1220 is configured to communicate with a network element such as a client.

The processor 1210 is configured to execute a program 1232, and specifically, can implement relevant functions of the transmission control apparatus in the apparatus embodiment of FIG. 8(a).

Specifically, the program 1232 may comprise a program code, the program code comprising computer operation instructions.

The processor 1210 may be a CPU, or an ASIC, or be configured to be one or more integrated circuits which implement the embodiments of the present application. The program 1232 can be specifically configured to cause the transmission control apparatus 1200 to execute the following steps:

sending transmission capability of a first device; and receiving transmission configuration between the first device and a second device, the transmission configuration being at least related to the transmission capability of the first device, and comprising information associated with at least two MIMO channels available for data transmission between the first device and the second device.

Reference can be made to corresponding description in the corresponding steps and units in the embodiments for specific implementation of the steps in the program 1232, which is not repeated herein. Those skilled in the art can clearly understand that, reference can be made to the corresponding process description in the method embodiments for the devices described above and the specific working procedures of the modules, and will not be repeated herein in order to make the description convenient and concise.

Figure 13:
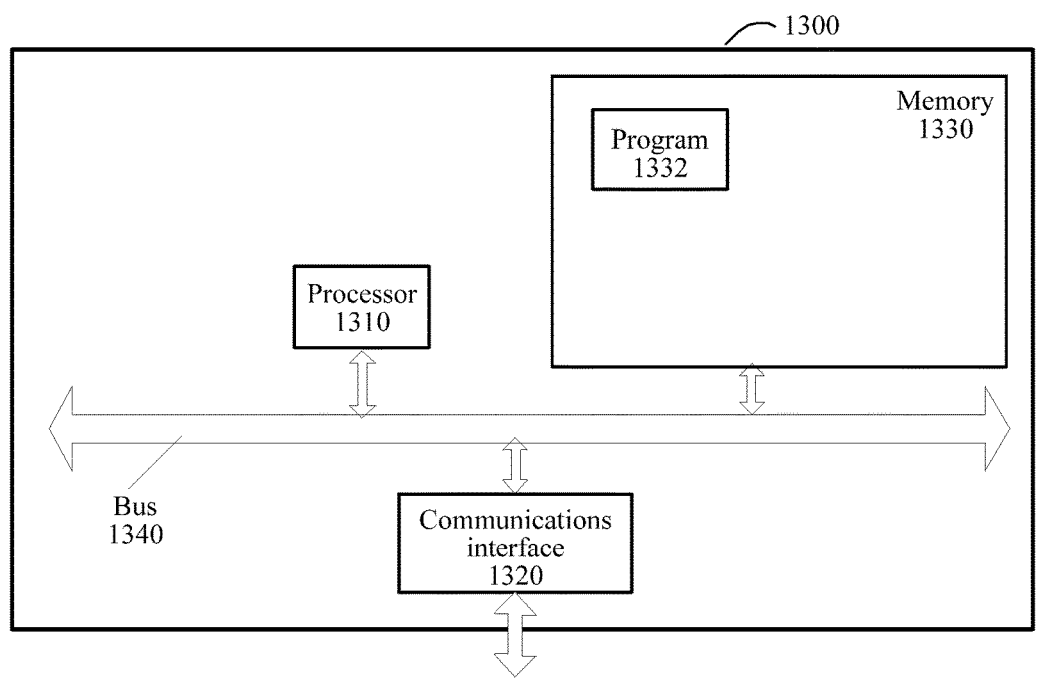
FIG. 13 is another schematic structural diagram of the transmission control apparatus according to the fourth embodiment of the present application.

FIG. 13 is a schematic structural diagram of a fourth transmission control apparatus 1300 according to an embodiment of the present application, and the specific embedment of the present application does not limit a specific implementation of the transmission control apparatus 1300. As shown in FIG. 13, the transmission control apparatus 1300 may comprise:

a processor 1310, a Communications Interface 1320, a memory 1330, and a communications bus 1340.

The processor 1310, the Communications Interface 1320, and the memory 1330 accomplish mutual communications via the communications bus 1340.

The Communications Interface 1320 is configured to communicate with a network element such as a client.

The processor 1310 is configured to execute a program 1332, and specifically, can implement relevant functions of the transmission control apparatus in the apparatus embodiment of FIG. 9(a).

Specifically, the program 1332 may comprise a program code, the program code comprising computer operation instructions.

The processor 1310 may be a CPU, or an ASIC, or be configured to be one or more integrated circuits which implement the embodiments of the present application. The program 1332 can be specifically configured to cause the transmission control apparatus 1300 to execute the following steps:

sending transmission capability of a first device; and receiving a transmission mode of data transmission performed by the first device and a second device, the transmission mode being at least related to the transmission capability of the first device, and the transmission mode comprising information associated with using at least two MIMO channels for the data transmission performed by the first device and the second device.

Reference can be made to corresponding description in the corresponding steps and units in the embodiments for specific implementation of the steps in the program 1332, which is not repeated herein. Those skilled in the art can clearly understand that, reference can be made to the corresponding process description in the method embodiments for the devices described above and the specific working procedures of the modules, and will not be repeated herein in order to make the description convenient and concise.

Those skilled in the art can clearly understand that, reference can be made to the corresponding process description in the apparatus embodiments for the devices described above and the specific working procedures of the modules, and will not be repeated herein in order to make the description convenient and concise.

Although the subject matter is described herein in the general context of program modules that execute in conjunction with an application program that runs on an operating system on a computer system, those skilled in the art will recognize that the subject matter may also be implemented in combination with other types of program modules. Generally, program modules comprise routines, programs, components, data structures and other types of structures that perform particular tasks or implement particular abstract data types. It can be understood by those skilled in the art that the subject matter described herein may be practiced with other computer system configurations, comprising handheld devices, multiprocessor systems, microprocessor-based or programmable consumer electronics, minicomputers, mainframe computers, and so on, and may also be practiced in distributed computing environments where tasks are performed by remote processing devices linked through a communications network. In a distributed computing environment, program modules may be located in both local and remote memory storage devices.

It can be appreciated by those of ordinary skill in the art that each exemplary unit and method step described with reference to the embodiments disclosed herein can be implemented by electronic hardware or a combination of computer software and electronic hardware. Whether these functions are executed in a hardware mode or a software mode depends on particular applications and design constraint conditions of the technical solution. The professional technicians can use different methods to implement the functions described with respect to each particular application, but such implementation should not be considered to go beyond the scope of the present application.

If the functions are implemented in the form of a software functional unit and is sold or used as an independent product, it can be stored in a computer-readable storage medium. Based on such understanding, the technical solution of the present application essentially or the part which contributes to the prior art or a part of the technical solution can be embodied in the form of a software product, and the computer software product is stored in a storage medium, and comprises several instructions for enabling a computer device (which can be a personal computer, a server, or a network device, and the like) to execute all or some steps of the method described in each embodiment of the present application. The foregoing storage medium comprises, a USB disk, a removable hard disk, a read-only memory (ROM), a random access memory (RAM), an erasable programmable read-only memory (EPROM), an electrically erasable programmable read-only memory (EEPROM), a flash memory or other solid-state memory technology, a CD-ROM, a digital versatile disc (DVD), an HD-DVD, a Blue-ray disc or other optical storage devices, a magnetic tape, magnetic disk storage or other magnetic storage devices, or any other medium that can be used for storing required information and can be accessed by a computer.

The above implementations are only intended to describe the present application rather than to limit the present application; various changes and variations can be made by those of ordinary skill in the art without departing from the spirit and scope of the present application, so all equivalent technical solutions also belong to the category of the present application, and the scope of patent protection of the present application should be defined by the claims.

What is claimed is:

1. A transmission control method, wherein the method comprises:

determining transmission capability of a first device; and determining a transmission mode of data transmission performed by the first device and a second device at least according to the transmission capability of the first device, the transmission mode comprising information associated with using at least two multiple-input-multiple-output (MIMO) channels in the data transmission performed by the first device and the second device; and determining transmission configuration between the first device and the second device at least according to the transmission capability of the first device, the transmission configuration comprising information associated with the at least two MIMO channels available for data transmission between the first device and the second device;

wherein the transmission capability of the first device comprises: antenna configuration of the first device and transmission modes that are supported by the first device, and the antenna configuration comprises a number of antennas that the first device has and the first device's capability of dividing the antennas into at least two antenna groups, each of which comprises at least one antenna.

2. The method of claim 1, wherein the transmission modes comprise: using the at least two MIMO channels for data transmission.

3. The method of claim 1, wherein the method further comprises: sending the transmission mode.

4. The method of claim 1, wherein the determining the transmission configuration between the first device and the second device comprises:
determining the transmission configuration at least according to the transmission capability of the first device and data transmission demands between the first device and the second device.

5. The method of claim 1, wherein the determining the transmission configuration between the first device and the second device comprises:
determining the transmission configuration at least according to the transmission capability of the first device and channel state information between the first device and the second device.

6. The method of claim 1, wherein the antenna configuration comprises the number of antennas that the first device has and a grouping situation where the antennas are divided into at least two antenna groups, each of which comprises at least one antenna.

7. The method of claim 1, wherein at least a portion of the antennas included in the at least two antenna groups are the same.

8. The method of claim 1, wherein the determining the transmission configuration between the first device and the second device comprises:
determining antenna groups of the first device comprised in each of the at least two MIMO channels available for data transmission between the first device and the second device at least according to the transmission capability of the first device.

9. The method of claim 1, wherein the determining the transmission capability of the first device further comprises:
acquiring information associated with the transmission capability of the first device.

10. The method of claim 1, wherein, the method further comprises:
acquiring information associated with the transmission capability of the second device; and
the determining the transmission configuration between the first device and the second device comprises:
determining the transmission configuration at least according to the transmission capability of the first device and the transmission capability of the second device.

11. The method of claim 1, wherein, the method further comprises:
sending information of the transmission configuration through placing it in a message or control instruction related to radio resource control (RRC) from an upper layer.

12. A transmission control method, wherein the method comprises:
sending transmission capability of a first device; and
receiving a transmission mode of data transmission performed by the first device and a second device, the transmission mode being at least related to the transmission capability of the first device, and the transmission mode comprising information associated with using at least two multiple-input-multiple-output (MIMO) channels for the data transmission performed by the first device and the second device;
receiving transmission configuration between the first device and the second device, the transmission configuration between the first device and the second device being at least related to the transmission capability of the first device, and the transmission configuration comprising information associated with the at least two MIMO channels available for data transmission between the first device and the second device; and
wherein the transmission capability of the first device comprises: antenna configuration of the first device and transmission modes that are supported by the first device, and the antenna configuration comprises a number of antennas that the first device has and the first device's capability of dividing the antennas into at least two antenna groups, each of which comprises at least one antenna.

13. The method of claim 12, wherein the transmission modes comprise: using the at least two MIMO channels for data transmission.

14. The method of claim 12, wherein the transmission configuration is at least related to the transmission capability of the first device and data transmission demands between the first device and the second device.

15. The method of claim 12, wherein the transmission configuration is at least related to the transmission capability of the first device and channel state information between the first device and the second device.

16. The method of claim 12, wherein the antenna configuration comprises the number of antennas that the first device has and a grouping situation where the antennas are divided into at least two antenna groups, each of which comprises at least one antenna.

17. The method of claim 12, wherein at least a portion of the antennas included in the at least two antenna groups are the same.

18. The method of claim 12, wherein the transmission configuration comprises information associated with antenna groups of the first device comprised in each of the at least two MIMO channels available for data transmission between the first device and the second device.

19. The method of claim 12, wherein the receiving the transmission configuration comprises:
receiving a message or control instruction related to radio resource control (RRC) from an upper layer, the message or control instruction comprising the transmission configuration.

20. A transmission control apparatus, wherein the apparatus comprises:
a sixth determination module, configured to determine transmission capability of a first device; and
a seventh determination module, configured to determine a transmission mode of data transmission performed by the first device and a second device at least according to the transmission capability of the first device, the transmission mode comprising information associated with using at least two multiple-input-multiple-output (MIMO) channels for the data transmission performed by the first device and the second device; and
an eighth determination module, configured to determine the transmission configuration between the first device and the second device at least according to the transmission capability of the first device, the transmission configuration comprising information associated with the at least two MIMO channels available for data transmission between the first device and the second device;
wherein the transmission capability of the first device comprises: antenna configuration of the first device and transmission modes that are supported by the first device, and the antenna configuration comprises a number of antennas that the first device has and the first device's capability of dividing the antennas into at least two antenna groups, each of which comprises at least one antenna.

21. The apparatus of claim 20, wherein the transmission mode comprises: using the at least two MIMO channels for data transmission.

22. The apparatus of claim 20 wherein the apparatus further comprises:
a third sending module, configured to send the transmission mode.

23. The apparatus of claim 20, wherein the eighth determination module comprises:
a sixth determination unit, configured to determine the transmission configuration at least according to the transmission capability of the first device and data transmission demands between the first device and the second device.

24. The apparatus of claim 20, wherein the eighth determination module comprises:
a seventh determination unit, configured to determine the transmission configuration at least according to the transmission capability of the first device and channel state information between the first device and the second device.

25. The apparatus of claim 20, wherein the eighth determination module is configured to determine antenna groups of the first device comprised in each of the at least two MIMO channels available for data transmission between the first device and the second device at least according to the transmission capability of the first device.

26. The apparatus of claim 20, wherein the apparatus further comprises:
a tenth determination module, configured to acquire information associated with the transmission capability of the second device;
wherein the eighth determination module is configured to determine the transmission configuration at least according to the transmission capability of the first device and the transmission capability of the second device.

27. The apparatus of claim 20, wherein the apparatus further comprises:
a fourth sending module configured to send information of the transmission configuration through placing it in a message or control instruction related to radio resource control (RRC) from an upper layer.

28. A transmission control apparatus, wherein the apparatus comprises:
a ninth sending module, configured to send transmission capability of a first device; and
a third receiving module, configured to receive a transmission mode of data transmission performed by the first device and a second device, the transmission mode being at least related to the transmission capability of the first device, and the transmission mode comprising information associated with using at least two multiple-input-multiple-output (MIMO) channels for the data transmission performed by the first device and the second device; and
a fourth receiving module, configured to receive transmission configuration between the first device and the second device, the transmission configuration between the first device and the second device being at least related to the transmission capability of the first device, and the transmission configuration comprising information associated with the at least two MIMO channels available for data transmission between the first device and the second device;
wherein the transmission capability of the first device comprises: antenna configuration of the first device and transmission modes that are supported by the first device, and the antenna configuration comprises a number of antennas that the first device has and the first device's capability of dividing the antennas into at least two antenna groups, each of which comprises at least one antenna.

29. The apparatus of claim 28, wherein the transmission mode comprises: using the at least two MIMO channels for data transmission.

30. The apparatus of claim 28, wherein the fourth receiving module comprises:
a second receiving unit, configured to receive a message or control instruction related to radio resource control (RRC) from an upper layer, the message or control instruction comprising the transmission configuration.

31. A non-transitory computer-readable storage medium, comprising at least one set of executable instructions, which, in response to execution, cause a system comprising a processor to perform operations, comprising:
determining transmission capability of a first device; and
determining a transmission mode of data transmission performed by the first device and a second device at least according to the transmission capability of the first device, the transmission mode comprising information associated with using at least two multiple-input-multiple-output (MIMO) channels in the data transmission performed by the first device and the second device; and
determining transmission configuration between the first device and the second device at least according to the transmission capability of the first device, the transmission configuration comprising information associated with the at least two MIMO channels available for data transmission between the first device and the second device;
wherein the transmission capability of the first device comprises: antenna configuration of the first device and transmission modes that are supported by the first device, and the antenna configuration comprises a number of antennas that the first device has and the first device's capability of dividing the antennas into at least two antenna groups, each of which comprises at least one antenna.

32. A device for transmission control comprising a processor and memory, wherein the memory storing computer executable instructions, the processor being connected with the memory via a communication bus, and when the device is operating, the processor executes or facilitates execution of the executable instructions stored by the memory:
   determining transmission capability of a first device; and
   determining a transmission mode of data transmission performed by the first device and a second device at least according to the transmission capability of the first device, the transmission mode comprising information associated with using at least two multiple-input-multiple-output (MIMO) channels in the data transmission performed by the first device and the second device; and
   determining transmission configuration between the first device and the second device at least according to the transmission capability of the first device, the transmission configuration comprising information associated with the at least two MIMO channels available for data transmission between the first device and the second device;
   wherein the transmission capability of the first device comprises: antenna configuration of the first device and transmission modes that are supported by the first device, and the antenna configuration comprises a number of antennas that the first device has and the first device's capability of dividing the antennas into at least two antenna groups, each of which comprises at least one antenna.

33. A non-transitory computer-readable storage medium, comprising at least one set of executable instructions, which, in response to execution, cause a system comprising a processor to perform operations, comprising:
   sending transmission capability of a first device; and
   receiving a transmission mode of data transmission performed by the first device and a second device, the transmission mode being at least related to the transmission capability of the first device, and the transmission mode comprising information associated with using at least two multiple-input-multiple-output (MIMO) channels for the data transmission performed by the first device and the second device;
   receiving transmission configuration between the first device and the second device, the transmission configuration between the first device and the second device being at least related to the transmission capability of the first device, and the transmission configuration comprising information associated with the at least two MIMO channels available for data transmission between the first device and the second device; and
   wherein the transmission capability of the first device comprises: antenna configuration of the first device and transmission modes that are supported by the first device, and the antenna configuration comprises a number of antennas that the first device has and the first device's capability of dividing the antennas into at least two antenna groups, each of which comprises at least one antenna.

34. A device for transmission control comprising a processor and memory, wherein the memory storing computer executable instructions, the processor being connected with the memory via a communication bus, and when the device is operating, the processor executes or facilitates execution of the executable instructions stored by the memory:
   sending transmission capability of a first device; and
   receiving a transmission mode of data transmission performed by the first device and a second device, the transmission mode being at least related to the transmission capability of the first device, and the transmission mode comprising information associated with using at least two multiple-input-multiple-output (MIMO) channels for the data transmission performed by the first device and the second device;
   receiving transmission configuration between the first device and the second device, the transmission configuration between the first device and the second device being at least related to the transmission capability of the first device, and the transmission configuration comprising information associated with at least two MIMO channels available for data transmission between the first device and the second device; and
   wherein the transmission capability of the first device comprises: antenna configuration of the first device and transmission modes that are supported by the first device, and the antenna configuration comprises a number of antennas that the first device has and the first device's capability of dividing the antennas into at least two antenna groups, each of which comprises at least one antenna.

\* \* \* \* \*